(12) United States Patent
Matsushima

(10) Patent No.: US 10,416,497 B2
(45) Date of Patent: Sep. 17, 2019

(54) LIQUID CRYSTAL DISPLAY DEVICE

(71) Applicant: Japan Display Inc., Minato-ku (JP)

(72) Inventor: Toshiharu Matsushima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/427,710

(22) Filed: Feb. 8, 2017

(65) Prior Publication Data
US 2017/0227822 A1 Aug. 10, 2017

(30) Foreign Application Priority Data

Feb. 9, 2016 (JP) ................... 2016-022631

(51) Int. Cl.
*G02F 1/1337* (2006.01)
*G02F 1/1343* (2006.01)

(52) U.S. Cl.
CPC .. *G02F 1/133707* (2013.01); *G02F 1/134309* (2013.01); *G02F 1/134363* (2013.01); *G02F 2001/134345* (2013.01); *G02F 2001/134372* (2013.01)

(58) Field of Classification Search
CPC ... G02F 1/134363; G02F 2001/134372; G02F 2001/134381; G02F 2001/133707
See application file for complete search history.

(56) References Cited

U.S. PATENT DOCUMENTS

| | | | |
|---|---|---|---|
| 8,259,269 B2* | 9/2012 | Itou | G02F 1/134363 349/128 |
| 9,052,547 B2* | 6/2015 | Yoso | G02F 1/134363 |
| 9,513,516 B2* | 12/2016 | Matsushima | G02F 1/134363 |
| 2013/0100388 A1 | 4/2013 | Matsushima | |
| 2014/0092353 A1 | 4/2014 | Matsushima | |
| 2014/0293176 A1 | 10/2014 | Tamaki et al. | |
| 2014/0293177 A1* | 10/2014 | Matsushima | G02F 1/134363 349/33 |
| 2014/0354931 A1* | 12/2014 | Kurasawa | G02F 1/134336 349/124 |
| 2015/0160520 A1 | 6/2015 | Matsushima | |
| 2015/0323842 A1 | 11/2015 | Matsushima | |
| 2016/0062191 A1 | 3/2016 | Matsushima | |
| 2016/0161811 A1 | 6/2016 | Matsushima | |
| 2016/0299390 A1 | 10/2016 | Matsushima | |

FOREIGN PATENT DOCUMENTS

JP 2015-114493 6/2015

* cited by examiner

*Primary Examiner* — Dung T Nguyen
(74) *Attorney, Agent, or Firm* — Oblon, McClelland, Maier & Neustadt, L.L.P.

(57) ABSTRACT

According to one embodiment, a liquid crystal display device includes first and second electrodes. A subpixel area includes a first area in which the first electrode is formed, and a second area in which the first electrode is not formed. The first area includes a connective area extending in first directions, and branch areas extending from the connective area. The subpixel areas include a first and second subpixel areas. The first directions intersect with second directions. Each of the branch areas extends from the connective area in the second direction 2A in the first subpixel area, and each of the branch areas extends from the connective area in the second direction 2B in the second subpixel area.

20 Claims, 15 Drawing Sheets

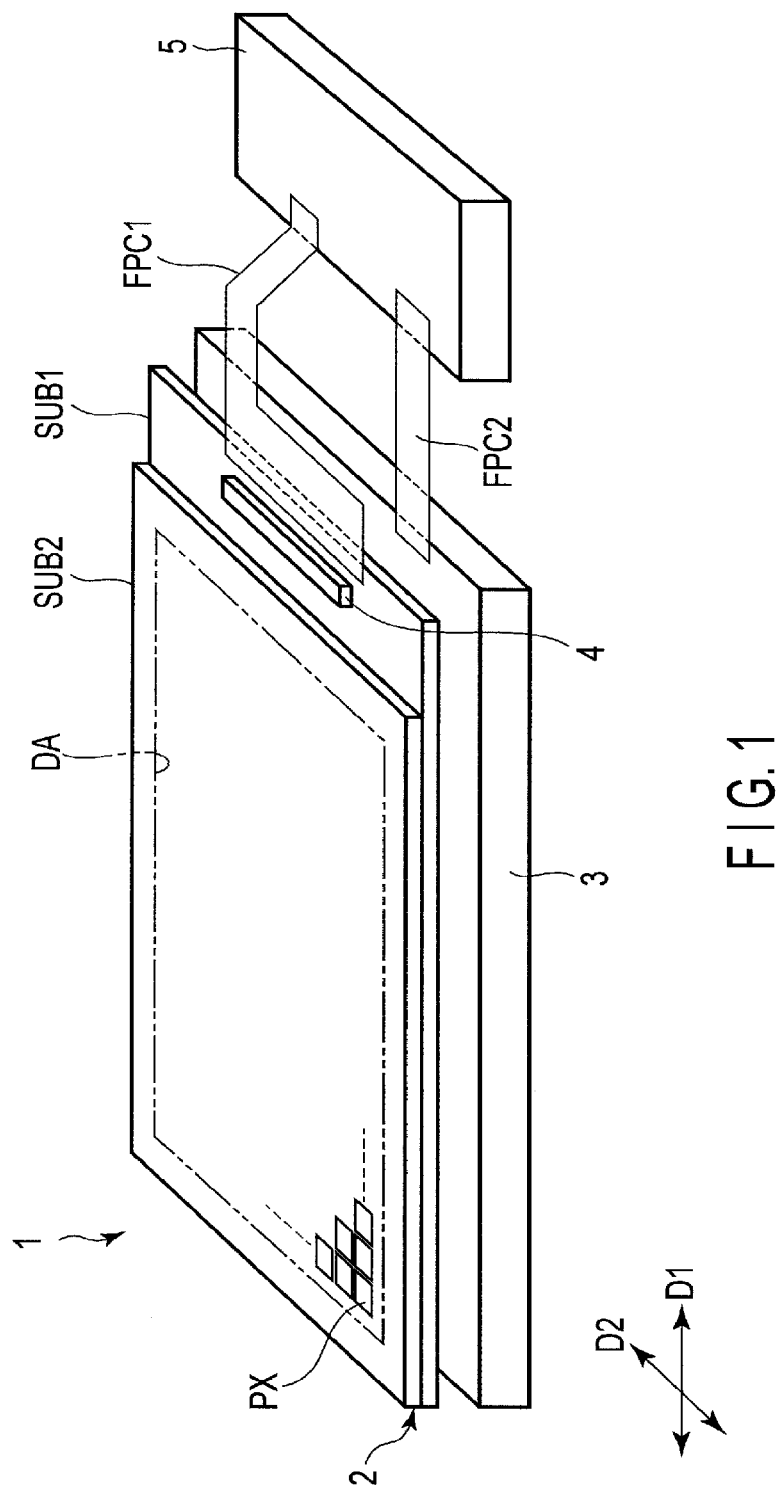
F I G. 1

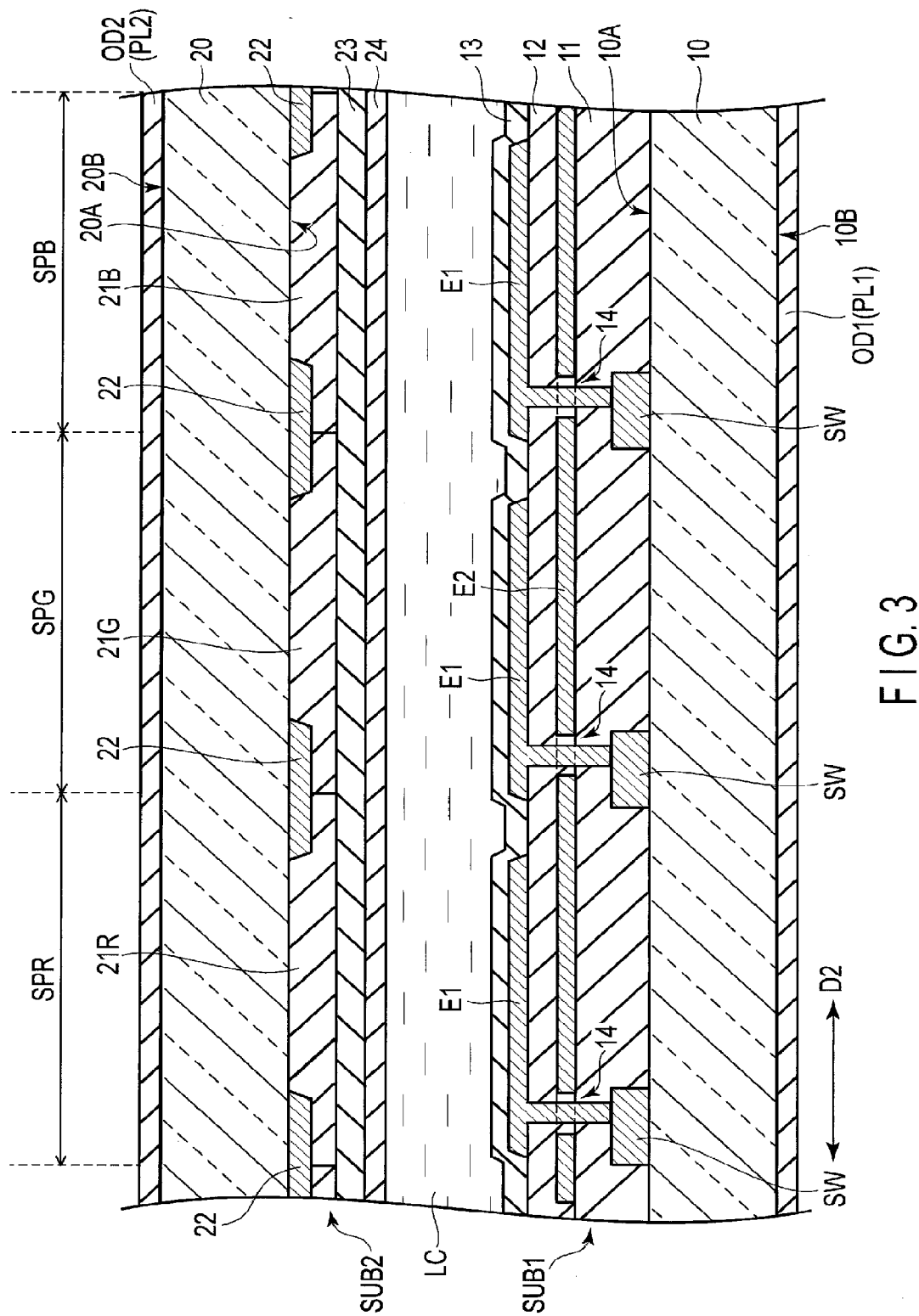
F I G. 3

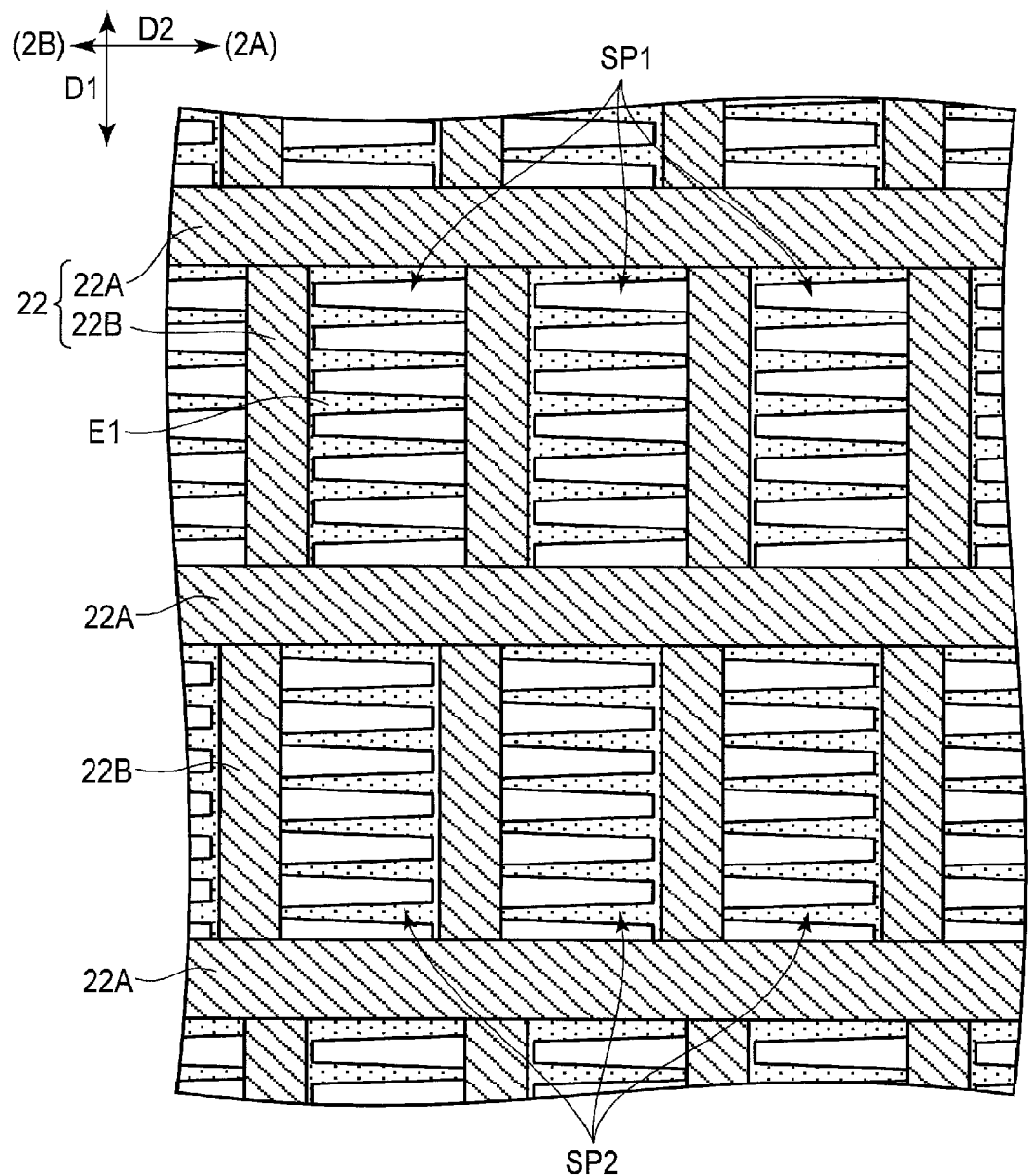
F I G. 10

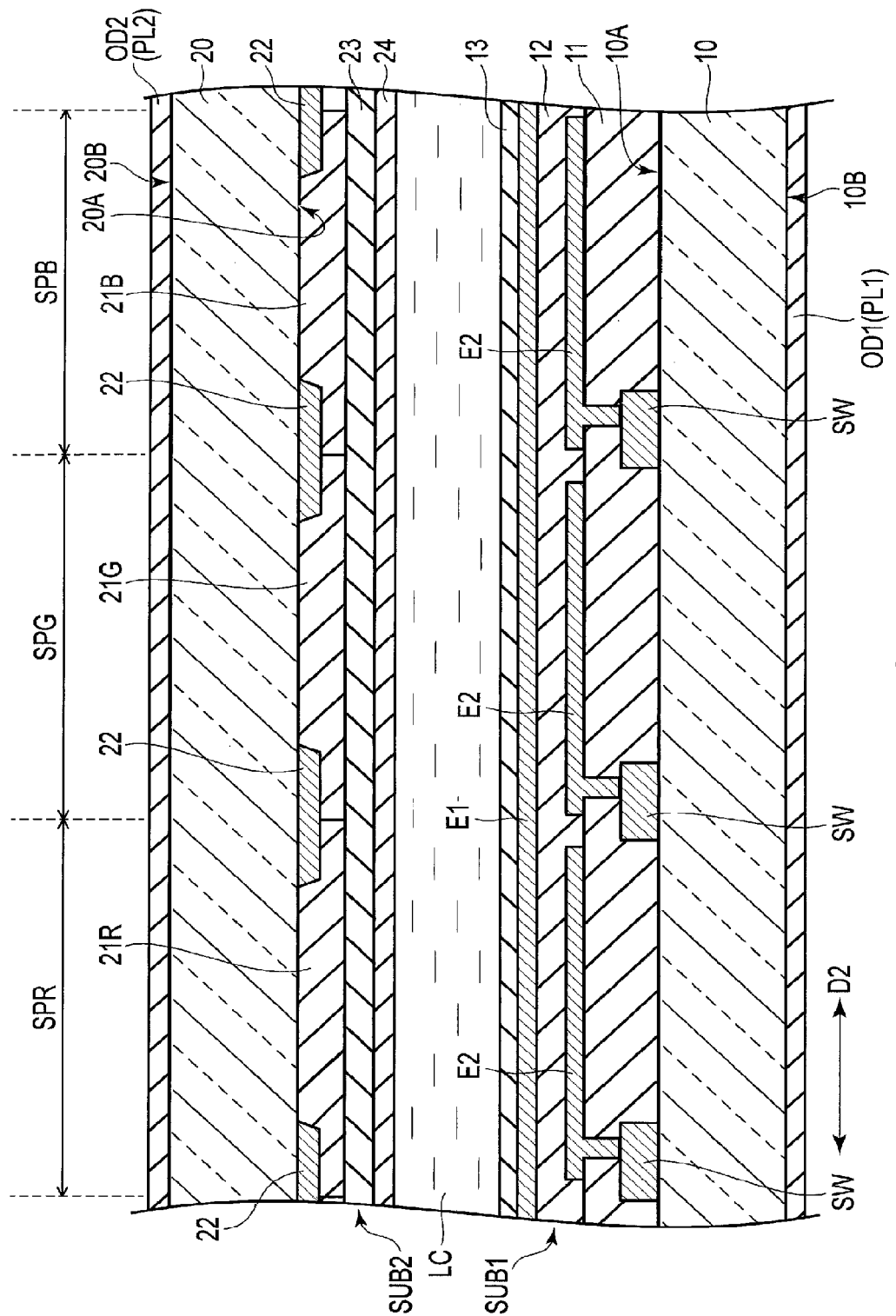
F I G. 15

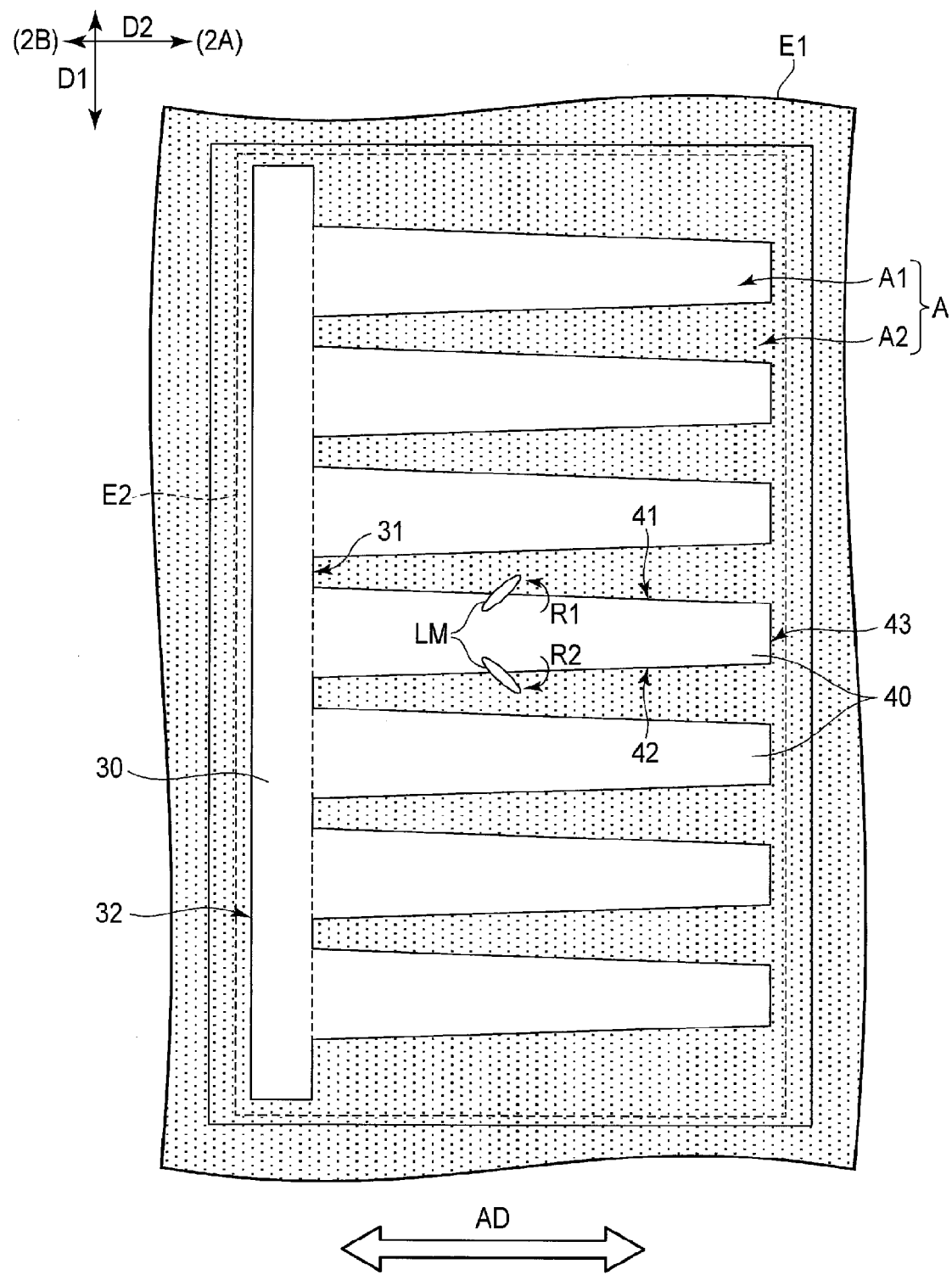
F I G. 16

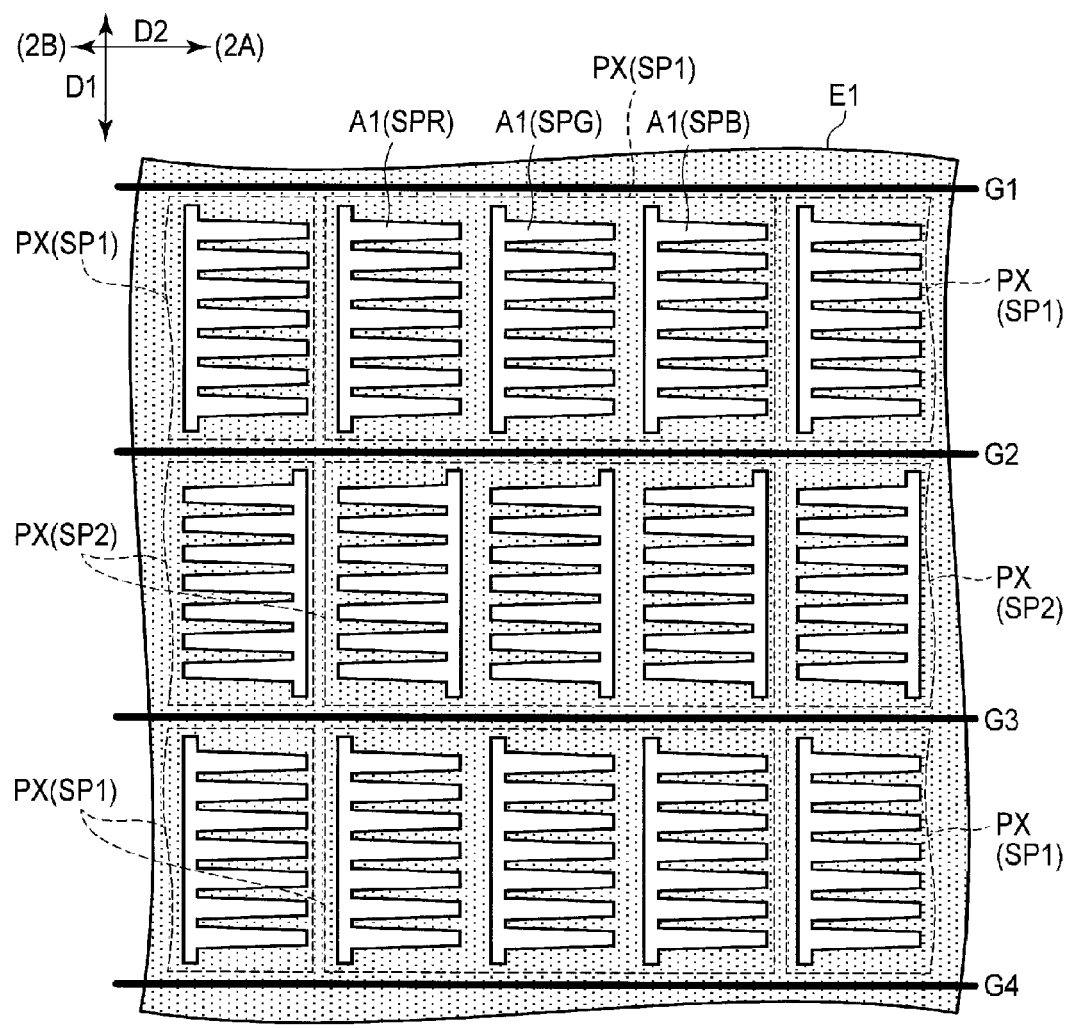
F I G. 17

LIQUID CRYSTAL DISPLAY DEVICE

CROSS-REFERENCE TO RELATED APPLICATIONS

This application is based upon and claims the benefit of priority from Japanese Patent Application No. 2016-022631, filed Feb. 9, 2016, the entire contents of which are incorporated herein by reference.

FIELD

Embodiments described herein relate generally to a liquid crystal display device.

BACKGROUND

A known example of a display device is a liquid crystal display device in in-plane switching (IPS) mode. The liquid crystal display device in IPS mode comprises a pair of substrates facing each other via a liquid crystal layer. One of the substrates comprises a pixel electrode and a common electrode. The alignment of the liquid crystal molecules of the liquid crystal layer is controlled using the lateral electric field generated between the electrodes. A liquid crystal display device in fringe-field switching (FFS) mode has been put to practical use. In the liquid crystal display device in FFS mode, a pixel electrode and a common electrode are provided in different layers, and the fringe electric field generated between the electrodes is used to control the alignment of liquid crystal molecules.

A liquid crystal display device, in which a pixel electrode and a common electrode are provided in different layers, a slit is provided in the electrode closer to a liquid crystal layer than the other electrode, and the liquid crystal molecules near the both sides of the slit in the width direction are rotated in opposite directions, has been developed. The system of this liquid crystal display device is clearly different from the FFS mode, and can increase the speed of response and improve the stability of alignment in comparison with the conventional FFS mode. Hereinafter, the structure of this type of liquid crystal display device is called a high-speed response mode.

In the liquid crystal display device in high-speed response mode, an electric field which does not contribute to the above alignment control may be generated between the pixel electrode and the common electrode. When such an electric field has acted on the liquid crystal layer, the alignment is changed in an undesired way, and thus, the display quality is degraded.

BRIEF DESCRIPTION OF THE DRAWINGS

FIG. 1 is a perspective view showing the general structure of a liquid crystal display device according to a first embodiment.

FIG. 3 shows a part of a cross-sectional surface of the liquid crystal display device.

FIG. 10 shows the planar shape of a light-shielding layer provided in the liquid crystal display device.

FIG. 15 shows a part of a cross-sectional surface of a liquid crystal display device according to a fifth embodiment.

FIG. 16 is a general plan view of a first electrode according to the fifth embodiment.

FIG. 17 shows an example in which the same method as FIG. 9 is applied to the fifth embodiment.

DETAILED DESCRIPTION

Figure 2:
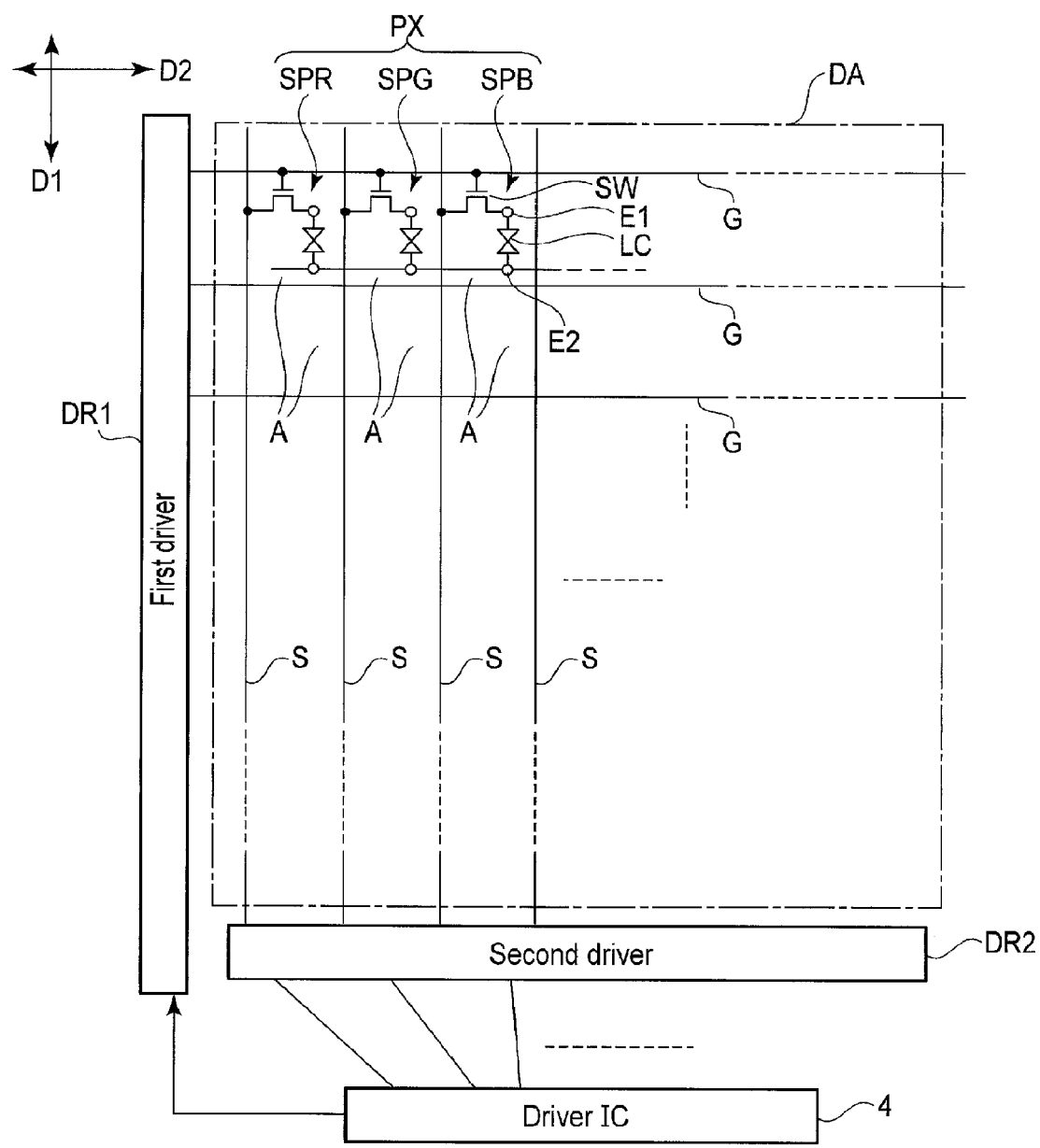
FIG. 2 shows the general equivalent circuit of the liquid crystal display device.

In general, according to one embodiment, a liquid crystal display device comprises a liquid crystal layer including liquid crystal molecules between a first substrate and a second substrate facing the first substrate. The first substrate comprises a plurality of video signal lines; a plurality of scanning signal lines; a first electrode second electrode which faces the first electrode via an insulating layer, and generates an electric field for the liquid crystal molecules rotation between the first electrode and the second electrode; and a plurality of subpixel areas. The first electrode is formed in a first layer, and the second electrode is formed in a second layer. The first layer comprises a first area and a second area in each of the subpixel areas. One of the first electrode and the second electrode is a pixel electrode, and the other one is a common electrode facing the plurality of pixel electrodes. One of the first area and the second area is an area in which the first electrode is formed, and the other one is an area in which the first electrode is not formed. The first area comprises a connective area extending in first directions, and a plurality of branch areas extending from the connective area. The branch area comprises a first side and a second side in width directions. When the electric field is generated, a rotational direction of the liquid crystal molecules is different between near the first side of the branch area and near the second side of the branch area. The subpixel areas comprise a first subpixel area and a second subpixel area. The first directions intersect with second directions, a second direction 2A is one of the second directions and a second direction 2B is the other one of the second directions. Each of the branch areas extends from the connective area in the second direction 2A in the first subpixel area, and each of the branch areas extends from the connective area in the second direction 2B in the second subpixel area.

The above structure allows the realization of a liquid crystal display device in high-speed response mode with an improved display quality.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. Further, in the specification and drawings, structural elements which function in the same or a similar manner to those described in connection with preceding drawings are denoted by like reference numbers, detailed description thereof being omitted unless necessary.

In each embodiment, a transmissive type liquid crystal display device is disclosed as an example of a liquid crystal display device. However, each embodiment does not prevent application of individual technical ideas disclosed in the embodiment to other types of display devices. Other types of display devices are assumed to include, for example, a reflective type liquid crystal display device which displays an image using outside light, and a liquid crystal display device having both the transmissive function and the reflective function.

First Embodiment

FIG. 1 is a perspective view showing the general structure of a liquid crystal display device 1 according to a first embodiment. The liquid crystal display device 1 may be used for various devices such as a smartphone, a tablet, a mobile phone, a computer, a television receiver, an in-vehicle unit, a game console and a wearable device.

The liquid crystal display device 1 comprises a display panel 2, a backlight 3, a driver IC 4 which drives the display panel 2, a control module 5 which controls the operations of the display panel 2 and the backlight 3, and flexible circuit boards FPC1 and FPC2 which transmit a control signal to the display panel 2 and the backlight 3.

In the present embodiment, first directions D1 and second directions D2 are defined as shown in FIG. 1. The first directions D1 are parallel to, for example, the long sides of the display panel 2. The second directions D2 are parallel to, for example, the short sides of the display panel 2. In the example shown in FIG. 1, the first directions D1 are perpendicular to the second directions D2. However, the first and second directions D1 and D2 may intersect at another angle.

The display panel 2 comprises a first substrate SUB1, a second substrate SUB2 facing the first substrate SUB1, and a liquid crystal layer (the liquid crystal layer LC described later) provided between the first substrate SUB1 and the second substrate SUB2. The display panel 2 comprises a display area DA (an active area) which displays an image. The display panel 2 comprises, for example, a plurality of pixels PX arranged in matrix in the first and second directions D1 and D2 in the display area DA.

The backlight 3 faces the first substrate SUB1. The driver IC 4 is mounted on, for example, the first substrate SUB1. However, the driver IC 4 may be mounted on the control module 5, etc. Flexible circuit board FPC1 connects the first substrate SUB1 and the control module 5. Flexible circuit board FPC2 connects the backlight 3 and the control module 5.

FIG. 2 shows the general equivalent circuit of the liquid crystal display device 1. The liquid crystal display device 1 comprises a first driver DR1, a second driver DR2, a plurality of scanning signal lines G, and a plurality of video signal lines S. The scanning signal lines G are connected to the first driver DR1. The video signal lines S are connected to the second driver DR2 and intersect with the scanning lines G.

The scanning signal lines G extend in the second directions D2 and are arranged in the first directions D1 in the display area DA. The video signal lines S extend in the first directions D1 and are arranged in the second directions D2 in the display area DA. The scanning signal lines G and the video signal lines S are formed on the first substrate SUB1.

The liquid crystal display device 1 comprises a plurality of subpixel areas A. The subpixel areas A are defined by the scanning signal lines G and the video signal lines S in a planar view. A subpixel SP is formed in each subpixel area A. Each pixel PX includes a plurality of subpixels SP. In the present embodiment, it is assumed that each pixel PX includes a subpixel SPR displaying red, a subpixel SPG displaying green and a subpixel SPB displaying blue. However, each pixel PX may further include, for example, a subpixel SP displaying white, or may include a plurality of subpixels SP corresponding to the same color.

Each subpixel SP comprises a switching element SW, a first electrode E1, and a second electrode E2 facing the first electrode E1. The switching element SW, the first electrode E1 and the second electrode E2 are formed on the first substrate SUB1 in the same manner as the scanning signal lines G and the video signal lines S. The first electrode E1 is formed in a first layer included in the first substrate SUB1. The second electrode E2 is formed in a second layer included in the first substrate SUB1.

In the present embodiment, each first electrode E1 is a pixel electrode, and is provided in a corresponding subpixel SP with a corresponding switching element SW. In the present embodiment, each second electrode E2 is a common electrode, and is formed over a plurality of subpixels SP. Each switching element SW is, for example, a thin-film transistor, and is electrically connected to a corresponding scanning signal line G, a corresponding video signal line S and a corresponding first electrode E1.

The first driver DR1 supplies a scanning signal to the scanning signal lines G in series. The second driver DR2 selectively supplies a video signal to the video signal lines S. When a scanning signal is supplied to a scanning signal line G corresponding to a switching element SW, and further when a video signal is supplied to the video signal line S connected to the switching element SW, voltage is applied to the first electrode E1 in accordance with the video signal. At this time, an electric field is generated between the first electrode E1 and the second electrode E2. By this electric field, the alignment of the liquid crystal molecules of the liquid crystal layer LC is changed from the initial alignment state where no voltage is applied. By this operation, an image is displayed in the display area DA.

FIG. 3 shows a part of a cross-sectional surface of the liquid crystal display device 1. The cross-sectional surface shown in FIG. 3 is the cross-sectional surface of subpixels SPR, SPG and SPB included in a pixel PX in the second directions D2.

The first substrate SUB1 comprises a first insulating substrate 10 such as a phototransmissive glass substrate or resin substrate. The first insulating substrate 10 comprises a first main surface 10A facing the second substrate SUB2, and a second main surface 10B opposite to the first main surface 10A. The first substrate SUB1 further comprises the switching elements SW, the first electrodes E1, the second electrode E2, a first insulating layer 11, a second insulating layer 12 and a first alignment film 13.

Subpixels SPR, SPG and SPB comprise the respective switching elements SW. Each switching element SW is provided on the first main surface 10A of the first insulating substrate 10, and is covered by the first insulating layer 11.

In FIG. 3, the illustration of the scanning signal lines G or the video signal lines S is omitted. Moreover, in FIG. 3, each switching element SW is simplified. In the actual device, the first insulating layer 11 includes a plurality of layers, and the switching elements SW include semiconductor layers and various electrodes formed in these layers.

In the example of FIG. 3, subpixels SPR, SPG and SPB comprise the respective first electrodes E1. The second electrode E2 is provided over subpixels SPR, SPG and SPB. The second electrode E2 is formed on the first insulating layer 11 (the above second layer). The second electrode E2 comprises an aperture 14 at a position facing each first electrode E1. The second electrode E2 is covered by the second insulating layer 12.

Each first electrode E1 is formed on the second insulating layer 12 (the above first layer), and faces the second electrode E2. The first electrodes E1 are electrically connected to the switching elements SW of subpixels SPR, SPG and SPB via the apertures 14, respectively. The first electrodes E1 and the second electrode E2 can be formed of a transparent conductive material such as indium tin oxide (ITO). The first alignment film 13 covers the first electrodes E1, and is in contact with the liquid crystal layer LC. An alignment treatment such as a rubbing treatment or a light alignment treatment is applied to the first alignment film 13.

The second substrate SUB2 comprises a second insulating substrate 20 such as a phototransmissive grass substrate or resin substrate. The second insulating substrate 20 comprises a first main surface 20A facing the first substrate SUB1, and a second main surface 20B opposite to the first main surface 20A. The second substrate SUB2 further comprises color filters 21 (21R, 21G and 21B), a light-shielding layer 22, an overcoat layer 23 and a second alignment film 24. An alignment treatment such as a rubbing treatment or a light alignment treatment is applied to the second alignment film 24 in the same manner as the first alignment film 13.

In a planar view, the light-shielding layer 22 is provided in each boundary between subpixels SPR, SPG and SPB. The overcoat layer 23 covers color filters 21R, 21G and 21B, and planarizes the surfaces of color filters 21R, 21G and 21B. The second alignment film 24 covers the overcoat layer 23, and is in contact with the liquid crystal layer LC. An alignment treatment such as a rubbing treatment or a light alignment treatment is applied to the second alignment film 24 in the same manner as the first alignment film 13.

A first optical element OD1 including a first polarizer PL1 is provided on the second main surface 10B of the first insulating substrate 10. A second optical element OD2 including a second polarizer PL2 is provided on the second main surface 20B of the second insulating substrate 20. The first polarizer PL1 has a first polarization axis (or a first absorption axis). The second polarizer PL2 has a second polarization axis (or a second absorption axis). The first polarization axis is perpendicular to the second polarization axis. Thus, the first and second polarization axes are in crossed Nicols.

Figure 4:
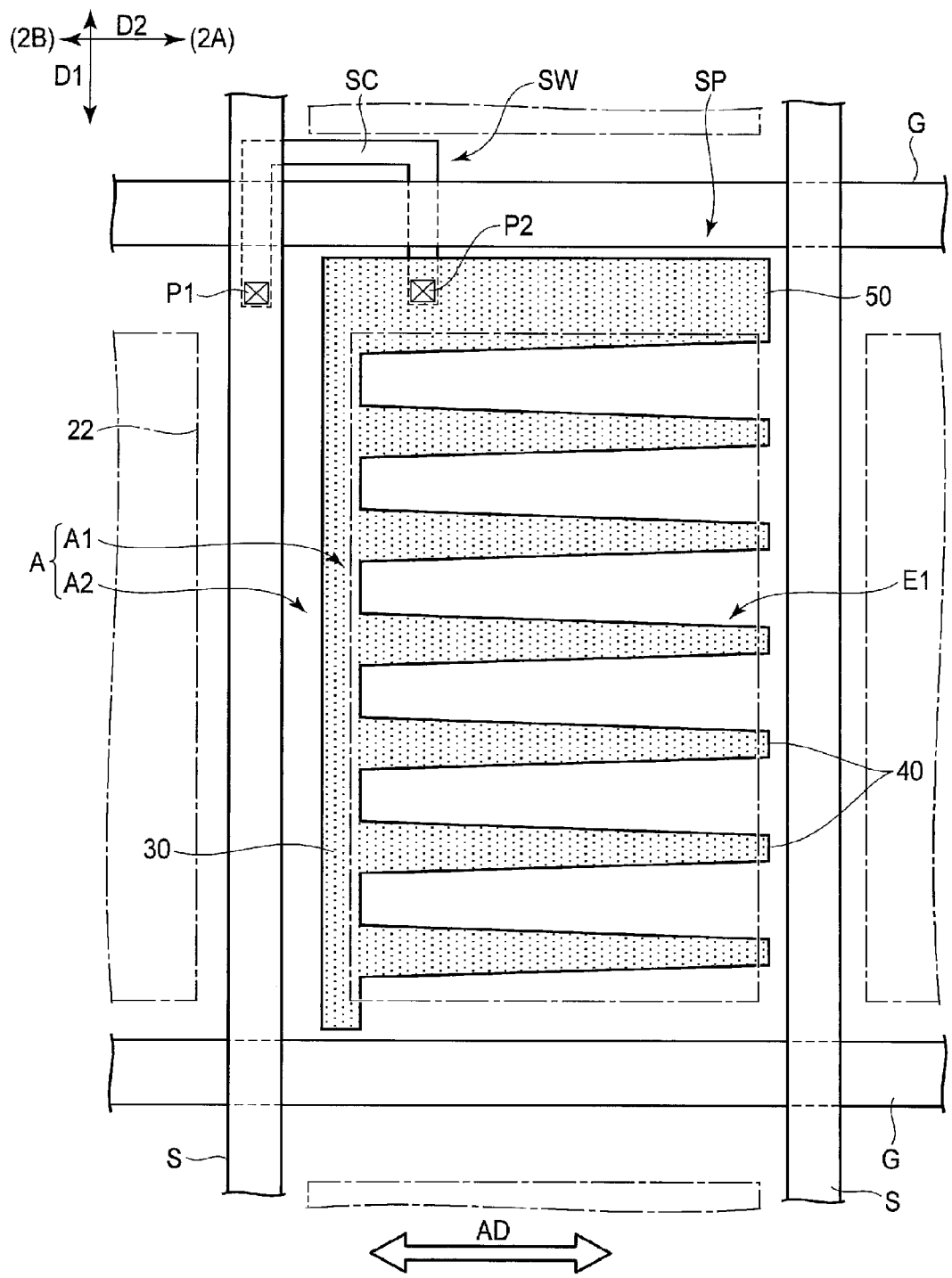
FIG. 4 is a general plan view of a subpixel provided in the liquid crystal display device.

FIG. 4 is a plan view schematically showing an example of a subpixel SP. In FIG. 4, one of the second directions D2 is defined as second direction 2A, and the other one is defined as second direction 2B. Each of the above subpixel areas A is formed by two scanning signal lines G adjacent to each other in the first directions D1 and two video signal lines S adjacent to each other in the second directions D2. The subpixel area A comprises a first area A1 and a second area A2. Both the first area A1 and the second area A2 are included in the above first layer. In FIG. 4, the first area A1 is shown with a dot pattern. The second area A2 has a shape obtained by removing the first area A1 from the subpixel area A.

The first area A1 comprises a long connective area 30 extending in the first directions D1, and a plurality of branch areas 40 extending from the connective area 30. For example, each branch area 40 has a shape tapering toward an end. In FIG. 4, the branch areas 40 extend from the connective area 30 in second direction 2A. In the subpixel area A, the connective area 30 is located near the video signal line S provided on the second direction 2B side. The end of each branch area 40 is located near the video signal line S provided on the second direction 2A side.

In FIG. 4, the first area A1 comprises an end area 50. The end area 50 extends from the connective area 30 in second direction 2A in the same manner as the branch areas 40. The end area 50 has a width greater than that of the branch areas 40 in the first directions D1.

In one of the first and second areas A1 and A2, the first electrode E1 is formed. In the other one, the first electrode E1 is not formed. In the example of FIG. 4, the first electrode E1 is formed in the first area A1, and is not formed in the second area A2.

The switching element SW comprises a semiconductor layer SC. The semiconductor layer SC is connected to the video signal line S at a connective position P1, and is connected to the first electrode E1 at a connective position P2. In the example of FIG. 4, connective position P2 is included in the end area 50. The semiconductor layer SC intersects with the upper scanning signal line G in the figure twice. Thus, FIG. 4 shows an example in which the switching element SW is a double-gate switching element. However, the switching element SW may be a single-gate switching element which intersects with the scanning signal line G only once.

In FIG. 4, the border portions of the light-shielding layer 22 are shown with alternate long and short dash lines. The light-shielding layer 22 overlaps the scanning signal lines G, the video signal lines S and the switching element SW. Moreover, in the example of FIG. 4, the light-shielding layer 22 overlaps a part of the connective area 30, and overlaps the ends of the branch areas 40. The details of the light-shielding layer 22 are explained later with reference to FIG. 11.

An alignment treatment is applied to the first alignment film 13 and the second alignment film 24 shown in FIG. 3 in alignment treatment directions AD parallel to the second directions D2. Thus, the first alignment film 13 and the second alignment film 24 have a function for causing the liquid crystal molecules to be aligned in the initial alignment directions parallel to the alignment treatment directions AD. In the present embodiment, the extension directions of the branch areas 40 are identical with the initial alignment directions of the liquid crystal molecules.

The above structure allows the realization of a high-speed response mode in which the response is faster than that of the common FFS mode. The speed of response can be defined as, for example, the speed when the phototransmittance of the liquid crystal layer LC is changed between predetermined levels by the voltage application between the first electrode E1 and the second electrode E2.

Figure 5:
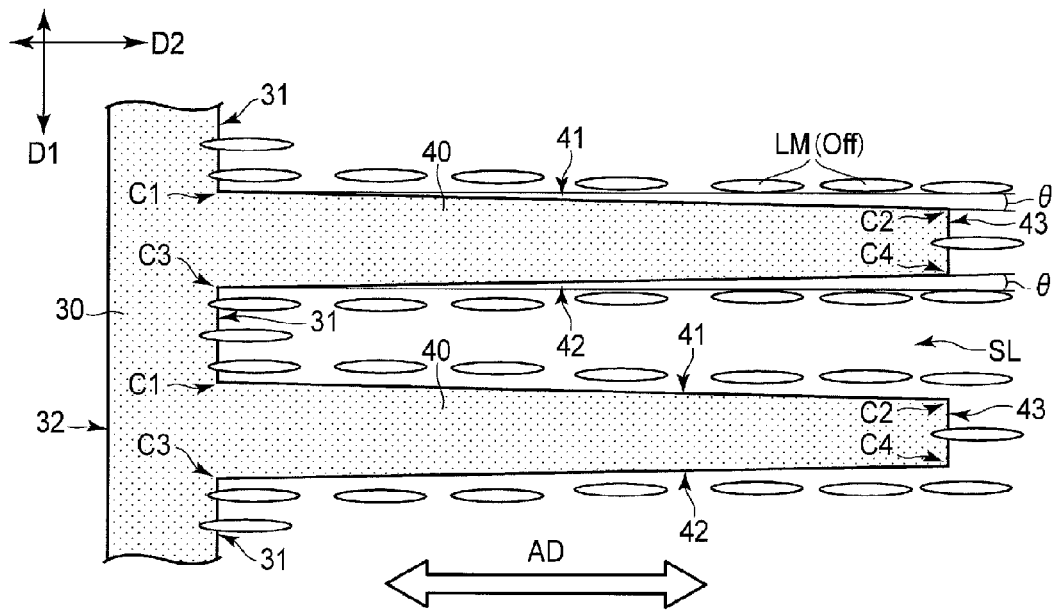
FIG. 5 shows the initial alignment state of liquid crystal molecules in the liquid crystal display device.
Figure 6:
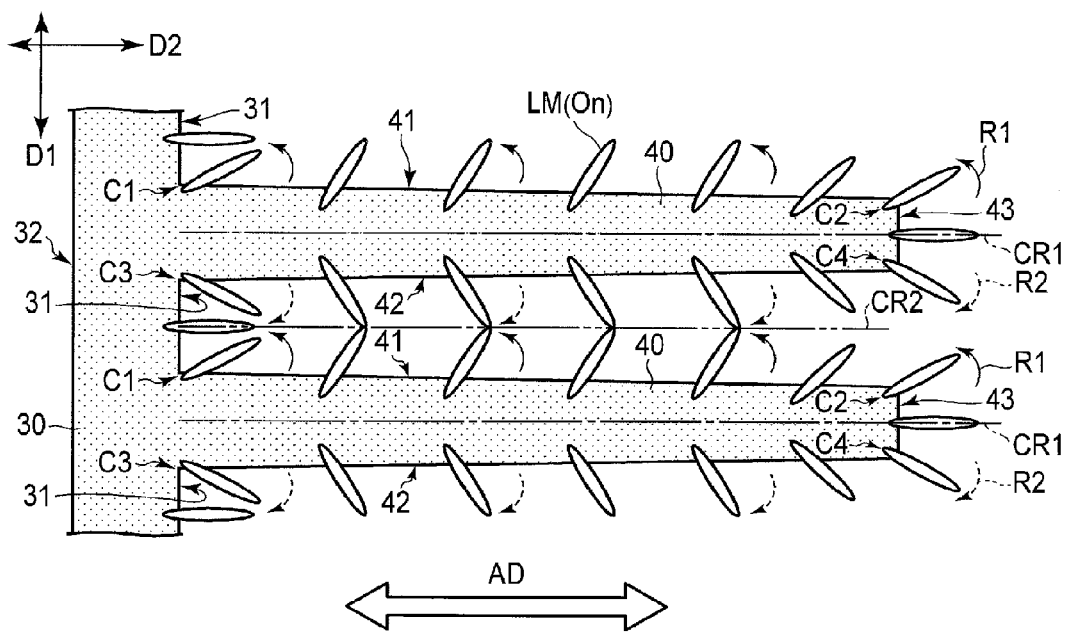
FIG. 6 shows the alignment state of liquid crystal molecules on which the above electric field has acted.
Figure 7:
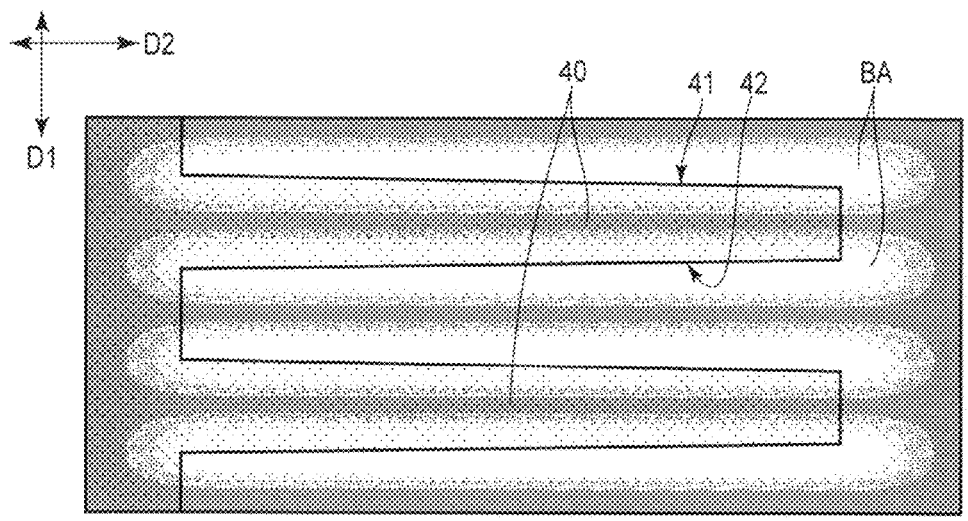
FIG. 7 shows a part of the luminance distribution of light passing through the above subpixel.

Now, this specification explains the operation principle of the high-speed response mode with reference to FIG. 5 to FIG. 7.

FIG. 5 shows a part of the first electrode E1 (the first area A1), and the initial alignment state of the liquid crystal molecules LM included in the liquid crystal layer LC. Each branch area 40 comprises a first side 41 and a second side 42 in the width directions (the first directions D1). Each branch area 40 further comprises a top side 43 connecting the first side 41 and the second side 42 at the end. Each first side 41 is inclined only by an angle θ which is an acute angle in a clockwise direction (for example, approximately 1.0 degree) with respect to the alignment treatment directions AD. Each second side 42 is inclined only by the angle θ in a counterclockwise direction with respect to the alignment treatment directions AD.

The connective area 30 comprises a bottom side 31 between two adjacent branch areas 40. The connective area 30 further comprises a side 32 opposite to the bottom sides 31. A slit SL defined by the first side 41, the second side 42 and the bottom side 31 is formed between two adjacent branch areas 40. The slit SL is a part of the second area A2.

A corner portion C1 is formed by the bottom side 31 and the first side 41. A corner portion C2 is formed by the first side 41 and the top side 43. A corner portion C3 is formed by the bottom side 31 and the second side 42. A corner portion C4 is formed by the second side 42 and the top side 43.

As shown in FIG. 5, the liquid crystal molecules LM are initially aligned such that the long axis conforms to the alignment treatment directions AD in an off-state where no voltage is applied between the first electrode E1 and the second electrode E2.

In the common FFS mode which is widely used, all the liquid crystal molecules rotate in the same direction when a fringe electric field is formed between two electrodes. However, the rotation of the liquid crystal molecules in the liquid crystal mode of the present invention is different from that of the liquid crystal molecules in the FFS mode. FIG. 6 shows the alignment state of the liquid crystal molecules LM in an on-state. In the liquid crystal molecules LM of the present embodiment, the dielectric anisotropy is positive. Therefore, when voltage is applied between the first electrode E1 and the second electrode E2 in the off-state shown in FIG. 5, force is applied to rotate the liquid crystal molecules LM such that the long axis is made parallel to the direction of the electric field generated by the application of voltage (or is made perpendicular to the equipotential line).

The liquid crystal molecules LM rotate in a first rotational direction R1 indicated with the solid arrows near corner portions C1 and C2. The liquid crystal molecules LM rotate in a second rotational direction R2 indicated with the dashed arrows near corner portions C3 and C4. The first rotational direction R1 and the second rotational direction R2 are opposite to each other. In the example of FIG. 6, the first rotational direction R1 is counterclockwise, and the second rotational direction R2 is clockwise.

Corner portions C1 to C4 have a function for controlling the alignment (in other words, a function for stabilizing the alignment) by controlling the rotational direction of the liquid crystal molecules LM near the first and second sides 41 and 42. The liquid crystal molecules near the first sides 41 rotate in the first rotational direction R1 in connection with the rotation of the liquid crystal molecules LM near corner portions C1 and C2. The liquid crystal molecules LM near the second sides 42 rotate in the second rotational direction R2 in connection with the rotation of the liquid crystal molecules LM near corner portions C3 and C4. Near the center CR1 of each branch area 40 and the center CR2 of each slit SL in the first directions D1, the liquid crystal molecules LM rotating in the first rotational direction R1 compete with the liquid crystal molecules LM rotating in the second rotational direction R2. The liquid crystal molecules LM in these areas are maintained in the initial alignment state, and do not substantially rotate.

As described above, in the high-speed response mode, the rotational directions of the liquid crystal molecules LM are aligned from the bottom sides 31 to the top sides 43 near the first and second sides 41 and 42. Thus, when voltage is applied, a response can be made fast. Moreover, the rotational directions of the liquid crystal molecules LM can be uniform. Thus, it is possible to improve the stability of alignment.

FIG. 7 shows a part of the luminance distribution of light passing through a subpixel SP in an on-state. The lighter, the higher the luminance is. The darker, the lower the luminance is. A high-luminance area BA which is long in the second directions D2 is generated near the first and second sides 41 and 42 in which the liquid crystal molecules LM have rotated from the initial alignment state. Near each center CR1 and CR2 shown in FIG. 6, the liquid crystal molecules LM have not substantially rotated from the initial alignment state. Thus, the luminance is low.

In the branch areas 40 shown in FIG. 5 to FIG. 7, the first and second sides 41 and 42 are inclined with respect to the alignment treatment directions AD. This structure also contributes to the improvement of the stability of alignment. Near the first and second sides 41 and 42 inclined with respect to the alignment treatment directions AD, the direction of the electric field intersects with the alignment treatment directions AD at an angle other than a right angle. Thus, it is possible to cause the rotational direction of the liquid crystal molecules LM to be substantially constant when voltage is applied. In particular, the effect of corner portions C1 to C4 is less in the middle portion of each branch area 40 in the second directions D2. In spite of a concern about the degradation of the stability of alignment, the stability of alignment can be also excellent in the middle portion by inclining the first and second sides 41 and 42 with respect to the alignment treatment directions AD.

Figure 8:
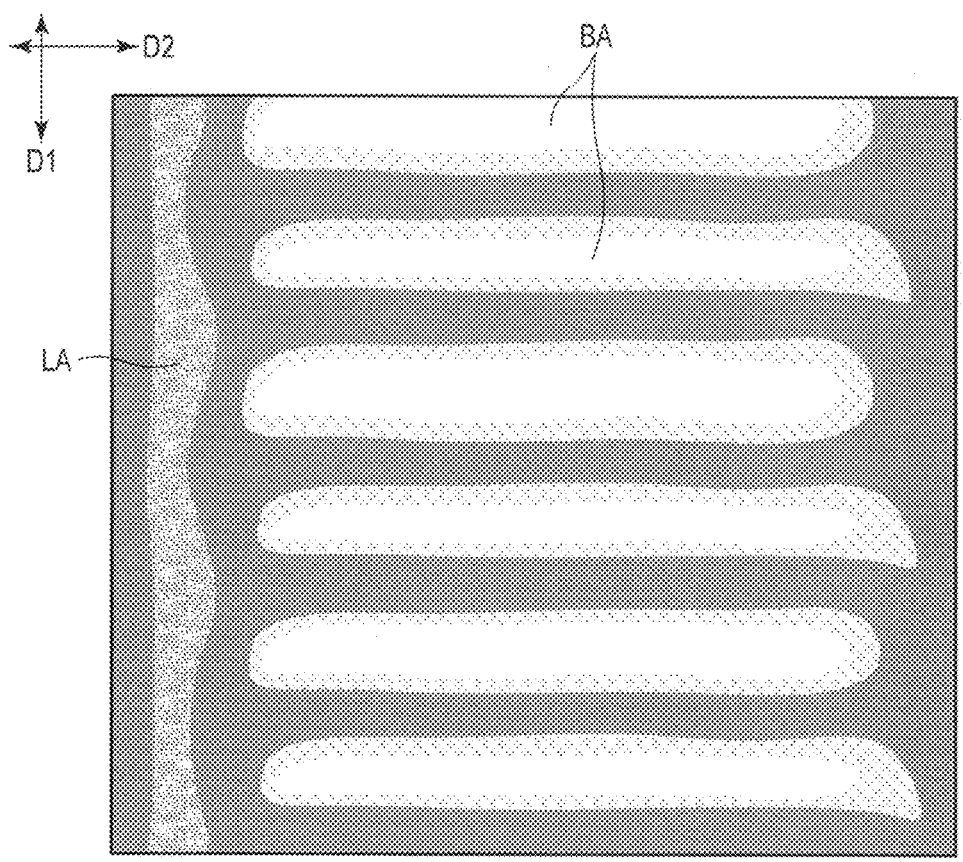
FIG. 8 shows an example of a light leak in the subpixel.

When the display area DA is obliquely viewed, the liquid crystal molecules LM are slightly rotated by the electric field near the sides 32. Thus, light may slightly pass through the vicinity of the sides 32. In the following explanation, the phenomenon in which light passes through the vicinity of the sides 32 is called a light leak. FIG. 8 shows an example of the light leak. FIG. 8 shows a part of the luminance distribution of light passing through a subpixel SP in an on-state in a manner similar to that of FIG. 7.

In FIG. 8, the high-luminance areas BA are generated in a manner similar to that of FIG. 7. Further, a line area LA which is long in the first directions D1 is generated. The line area LA is equivalent to the above light leak, and extends along the side 32. The luminance of the line area LA is lower than that of the high-luminance area BA. However, the line area LA may be a cause of the degradation of the display quality. For example, if the line area LA extends to an adjacent subpixel SP, the colors of the adjacent subpixels SP are mixed.

Now, this specification explains a structure for reducing the effect of a light leak near the sides 32.

Figure 9:
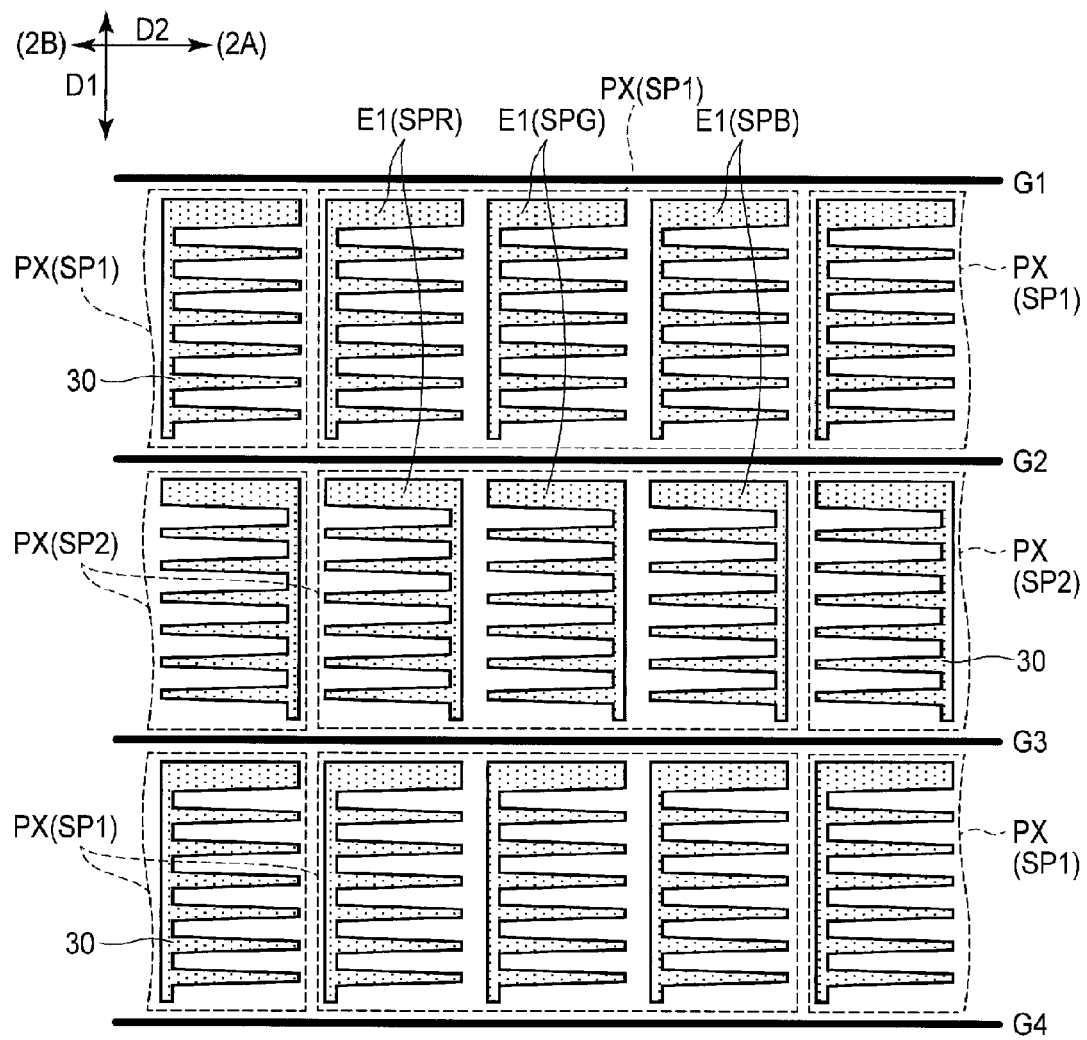
FIG. 9 shows an example layout of first electrodes provided in the subpixels.

FIG. 9 shows a planar example layout of a plurality of first electrodes E1. FIG. 9 shows the first electrodes E1 of subpixels SPR, SPG and SPB included in each of the pixels PX arranged between four scanning signal lines G. Hereinafter, the four scanning signal lines G are referred to as a first scanning signal line G1, a second scanning signal line G2, a third scanning signal line G3 and a fourth scanning signal line G4 in order from the upper side of FIG. 9.

The subpixels SP arranged in the display area DA include first subpixels (first subpixel areas) SP1 and second subpixels (second subpixel areas) SP2. Each first subpixel SP1 is a subpixel SP comprising the first electrode E1 shown in FIG. 4. Each second subpixel SP2 is a subpixel SP comprising a first electrode E1 having a shape obtained by reversing the first electrode E1 shown in FIG. 4 based on the first directions D1 as the axis. In the first electrode E1 of each second subpixel SP2, the branch areas 40 extend from the connective area 30 in second direction 2B.

In the example of FIG. 9, all of the subpixels SP included in the pixels PX between first and second scanning signal lines G1 and G2 and between the third and fourth scanning lines G3 and G4 are the first subpixels SP1. All of the subpixels SP included in the pixels PX between the second and third scanning signal lines G2 and G3 are the second subpixels SP2.

Even when the entire display area DA is viewed, the horizontal line in which the first subpixels SP1 are arranged in the second directions D2 and the horizontal line in which the second subpixels SP2 are arranged in the second directions D2 are arranged such that they alternate with each other in the first directions D1.

The position of the connective area 30 differs between each first subpixel SP1 and each second subpixel SP2. For example, when the display area DA is viewed in a specific oblique direction, a light leak occurs near the side 32 (see FIG. 6) in one of the first subpixel SP1 and the second subpixel SP2. In the other one, no light leak occurs. In this way, the areas in which a light leak occurs are dispersed. Thus, the effect of a light leak is difficult to be visually recognized. In this manner, the display quality is improved.

The color of the subpixel SP adjacent to the connective area 30 of a subpixel SP corresponding to a color differs between each horizontal line in which the first subpixels SP1 are arranged and each horizontal line in which the second subpixels SP2 are arranged. In other words, the color of the subpixel SP affected by the light leak of a subpixel SP corresponding to a color differs between these horizontal lines.

In a specific example, the connective area 30 of subpixel SPG is adjacent to subpixel SPR in each pixel PX between the first and second scanning signal lines G1 and G2; however, the connective area 30 of subpixel SPG is adjacent to subpixel SPB in each pixel PX between the second and third scanning lines G2 and G3. Thus, a light leak caused by the connective area 30 of subpixel SPG has an influence on subpixel SPR between the first and second scanning signal lines G1 and G2, and has an influence on subpixel SPB between the second and third scanning signal lines G2 and G3.

Even when a light leak occurs in both the first subpixels SP1 and the second subpixels SP2 in a state where the display area DA is viewed in a specific oblique direction, the relationship of subpixels SP affected by the light leak is not consistent in the display area DA. Thus, the effect of the light leak is dispersed. In this way, the effect on the display quality is reduced.

In the pixel layout shown in FIG. 9, when the shape of the light-shielding layer 22 is optimized, the effect of a light leak can be reduced, and further, the aperture ratio can be increased. FIG. 10 shows the planar shape of the light-shielding layer 22 with the first electrodes E1. Here, the light-shielding layer 22 is shown with oblique lines.

The light-shielding layer 22 comprises a first portion 22A extending in the second directions D2 between the subpixels SP adjacent to each other in the first directions D1, and a second portion 22B extending in the first directions D1 between the subpixels SP adjacent to each other in the second directions D2. The first portions 22A overlap the scanning signal lines G and the switching elements SW in a planar view. The second portions 22B overlap the video signal lines S in a planar view. The first and second portions 22A and 22B also overlap a part of the first electrodes E1.

In the example of FIG. 10, the center of each second portion 22B of the horizontal line in which the first subpixels SP1 are arranged is not linearly arranged with respect to the center of each second portion 22B of the horizontal line in which the second subpixels SP2 are arranged. They are out of alignment in the second directions D2.

Figure 11:
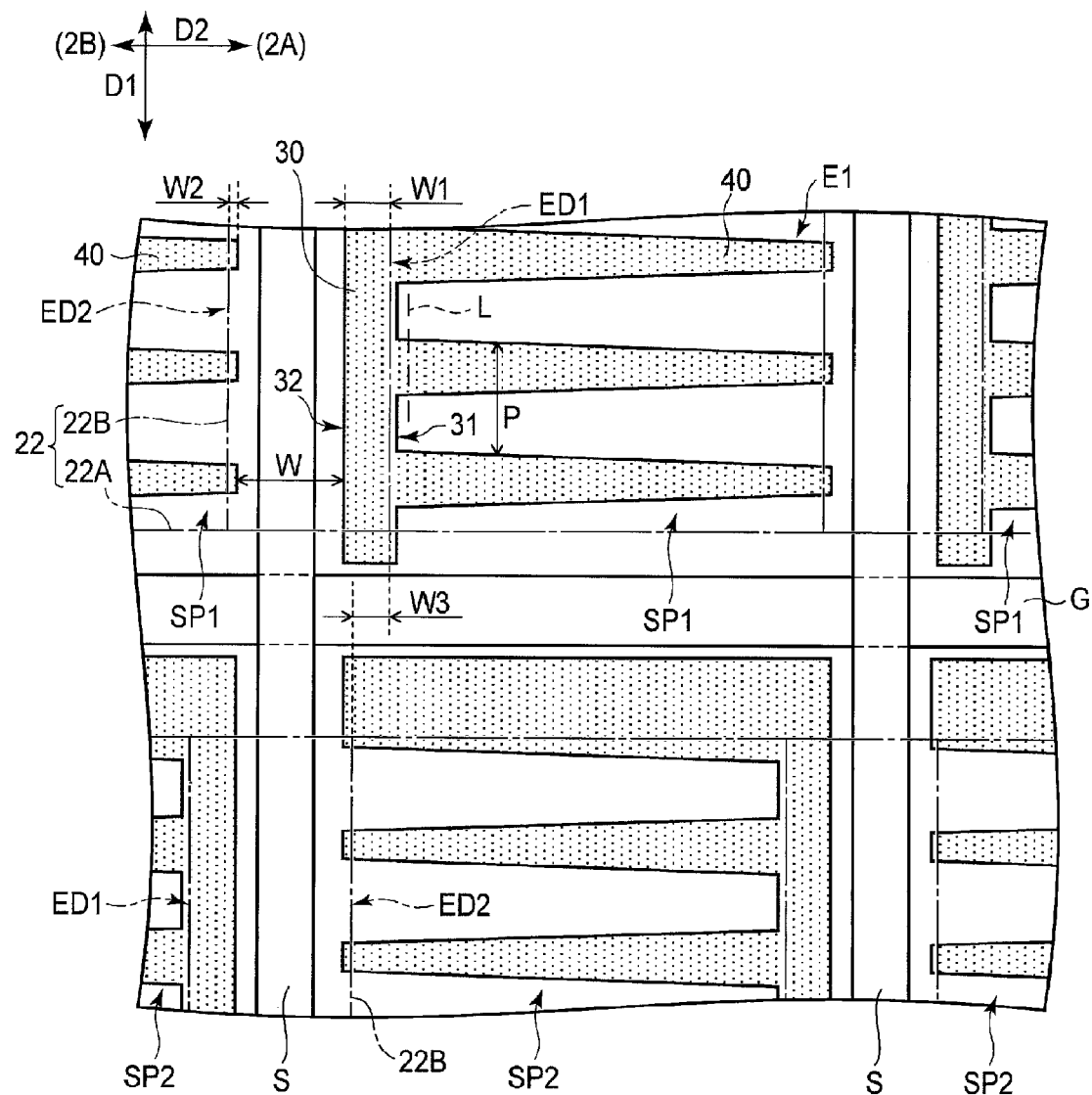
FIG. 11 specifically shows the positional relationship between the light-shielding layer and the first electrodes.

FIG. 11 more specifically shows the planar positional relationship between the light shielding layer 22 and the first electrodes E1. FIG. 11 also shows the scanning signal line G and the video signal lines S. The border portions of the light-shielding layer 22 are shown with alternate long and short dash lines. The second portion 22B of the light-shielding layer 22 comprises a first border portion ED1 and a second border portion ED2. The first and second border portions ED1 and ED2 are parallel to, for example, the first directions D1.

The light-shielding layer 22 overlaps the connective area 30 of the first subpixel SP1 shown in the upper central stage of FIG. 11. Specifically, the first border portion ED1 of the light-shielding layer 22 is located between each bottom side 31 and the side 32 of the connective area 30. Moreover, the light-shielding layer 22 overlaps the end portions of the branch areas 40 of the first subpixel SP1 shown in the upper left stage of FIG. 11.

The width in which the light-shielding layer 22 overlaps the connective area 30 in the second directions D2 is a first width W1. The width in which the light-shielding area 22 overlaps the end portions of the branch areas 40 in the second directions D2 is a second width W2. The vicinity of the branch areas 40 is an area which should contribute to display. To increase the aperture ratio, the second width W2 is preferably less. Since the above light leak may occur near the side 32 of the connective area 30, the first width W1 is preferably great. In consideration of this matter, in the example of FIG. 11, the first width W1 is greater than the second width W2 (W1>W2).

In a state where an electric field is formed between the first electrode E1 and the second electrode E2, the luminance of light passing through the vicinity of the ends of the branch areas 40 is decreased as the position is away from the ends of the branch areas 40. When the ends of the branch areas 40 overlap the light-shielding layer 22, the portions in which the luminance changes are shielded from light. In this way, the contrast of subpixels SP can be enhanced. The ends of the branch portions 40 may not overlap the light-shielding layer 22 (W2=0). In this case, the aperture ratio of subpixels SP can be increased.

A similar change in luminance also occurs near the base of each branch area 40. To further enhance the contrast, the first border portion ED1 of the second portion 22B may be positioned on the end side of each branch area 40 extending from the connective area 30 in comparison with the connective area 30. Specifically, for example, the first border portion ED1 is positioned on line L shown in FIG. 11. In this case, the connective area 30 completely overlaps the light-shielding layer 22.

All of the second portions 22B provided in the horizontal line in which the first subpixels SP1 are arranged have the above structure. The second portions 22B provided in the horizontal line in which the second subpixels SP2 are arranged also have the same structure. However, the position of the first border portion ED1 is replaced with the position of the second border portion ED2.

In the example of FIG. 11, the center of the second portion 22B in the second directions D2 is out of alignment with the center of the video signal line S in the second directions D2. The interval between the side 32 of the connective area 30 and the video signal line S is the same as the interval between the end of each branch area 40 and the video signal line S in both the first subpixel SP1 and the second subpixel SP2. In this case, if the second portions 22B of the horizontal lines are linearly arranged in the first directions D1, the first and second widths W1 and W2 are inconstant in the first and second subpixels SP1 and SP2.

In the example of FIG. 11, the second portions 22B of the horizontal line in which the first subpixels SP1 are arranged are out of alignment with the respective second portions 22B of the horizontal line in which the second subpixels SP2 are arranged in the second directions D2. Specifically, the first border portions ED1 of the horizontal line in which the first subpixels SP1 are arranged are out of alignment with the respective second border portions ED2 of the horizontal line in which the second subpixels SP2 are arranged in the second directions D2 only by a third width W3. Similarly, the second border portions ED2 of the horizontal line in which the first subpixels SP1 are arranged are out of alignment with the first border portions ED1 of the horizontal line in which the second subpixels SP2 are arranged in the second directions D2 only by the third width W3. In an example, the third width W3 is less than the first width W1, and is greater than the second width W2 (W2<W3<W1).

The pitch of the arrangement of the branch areas 40 in the first directions D1 is defined as P [μm]. The width between the branch areas 40 of one of two subpixels SP adjacent to each other in the second directions D2 and the connective area 30 of the other subpixel SP is defined as W [μm]. The fineness of the subpixels SP can be increased by decreasing the width W. When the width W is less, an electric field is generated between the adjacent first electrodes E1. Thus, the alignment of liquid crystal molecules at the end of each branch area 40 is unstable. The alignment of liquid crystal molecules between the adjacent branch areas 40 is more stable with increasing pitch P. Thus, the stability of alignment can be maintained even with a less width W by increasing the pitch P. In an example, both the stability of alignment and the high fineness can be obtained when the pitch P and the width W are determined so as to satisfy PW>8 [μm²], preferably, PW>10 [μm²].

In the present embodiment, the first electrodes E1 are reversed on the basis of the horizontal line as shown in FIG. 9 to reduce the effect of a light leak occurring near the sides 32 of the connective areas 30. In this structure, the acceptable error range when the first substrate SUB1 is attached to the second substrate SUB2 can be wide. In other words, two types of first electrodes E1 in opposite directions are present. Thus, even when, for example, the first substrate SUB1 is attached to the second substrate SUB2 such that they are out of alignment in the second directions D2, both the subpixels SP in which the color mixture is increased by the above light leak and the subpixels SP in which the color mixture is reduced are present. In this manner, it is possible to reduce the designing margin of each portion in consideration of an attachment error.

To deal with such a light leak, the width of the light-shielding layer 22 may be made great such that the color mixture by the light leak does not occur. However, in this method, the aperture ratio of the subpixels SP is reduced. In the structure of the present embodiment, it is possible to reduce the effect of a light leak without decreasing the aperture ratio.

In addition to the above effect, the preferred effects explained earlier and various other effects can be obtained from the present embodiment.

Second Embodiment

A second embodiment is explained. This section mainly looks at the difference from the first embodiment, and the explanations of the same structures as the first embodiment are arbitrarily omitted.

Figure 12:
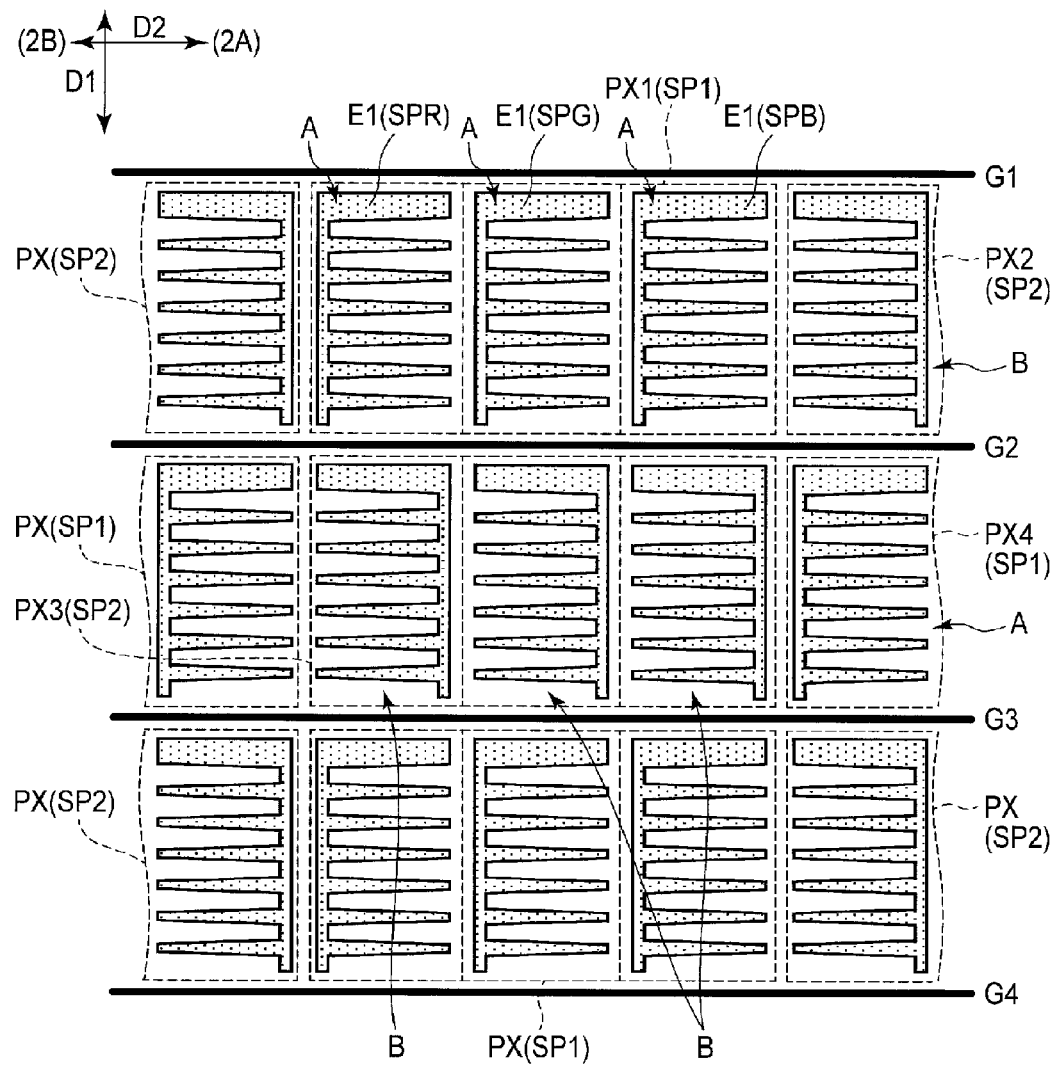
FIG. 12 shows a planar example layout of subpixels according to a second embodiment.

The present embodiment is different from the first embodiment in the arrangement form of first subpixels SP1 and second subpixels SP2. FIG. 12 shows a planar example layout of subpixels SP according to the second embodiment. In a manner similar to that of FIG. 9, FIG. 12 shows scanning signal lines G1 to G4 and subpixels SP between the scanning signal lines.

In FIG. 12, the first subpixels SP1 and the second subpixels SP2 are changed on the basis of the pixel PX instead of the horizontal line. In other words, a pixel PX in which the first subpixels SP1 are arranged alternates with a pixel PX in which the second subpixels SP2 are arranged in both first directions D1 and second directions D2.

This specification explains the structure of the present embodiment in a different viewpoint, particularly looking at four pixels PX (first to fourth pixels) arranged in a display area DA.

For example, the first and second pixels are provided between scanning signal lines G1 and G2. The third and fourth pixels are provided between scanning signal lines G2 and G3. The first pixel is adjacent to the third pixel in the first directions D1. The second pixel is adjacent to the fourth pixel in the first directions D1. In this case, all of the subpixels SP (subpixel areas A) included in the first and fourth pixels are the first subpixels SP1 (first subpixel areas). All of the subpixels SP (subpixel areas B) included in the second and third pixels are the second subpixels SP2 (second subpixel areas).

When, in FIG. 12, the pixel PX provided in the center of the upper stage, the pixel PX provided on the right of the upper stage, the pixel PX provided in the center of the middle stage and the pixel PX provided on the right of the middle stage are the first, second, third and fourth pixels, respectively, the first pixel is adjacent to the second pixel in the second directions D2, and the third pixel is adjacent to the fourth pixel in the second directions D2. However, another pixel PX may be provided between the first pixel and the second pixel and between the third pixel and the fourth pixel.

When the first and second subpixels SP1 and SP2 are arranged as shown in the present embodiment, the effect of the above light leak can be further dispersed in the display area DA in comparison with when the first subpixels SP1 alternate with the second subpixels SP2 on the basis of the horizontal line. Thus, the display quality of a liquid crystal display device 1 can be further improved.

In addition to the above explanation, effects similar to those of the first embodiment are obtained from the present embodiment.

Third Embodiment

A third embodiment is explained. This section mainly looks at the difference from the above embodiments, and the explanations of the same structures as the above embodiments are arbitrarily omitted.

Figure 13:
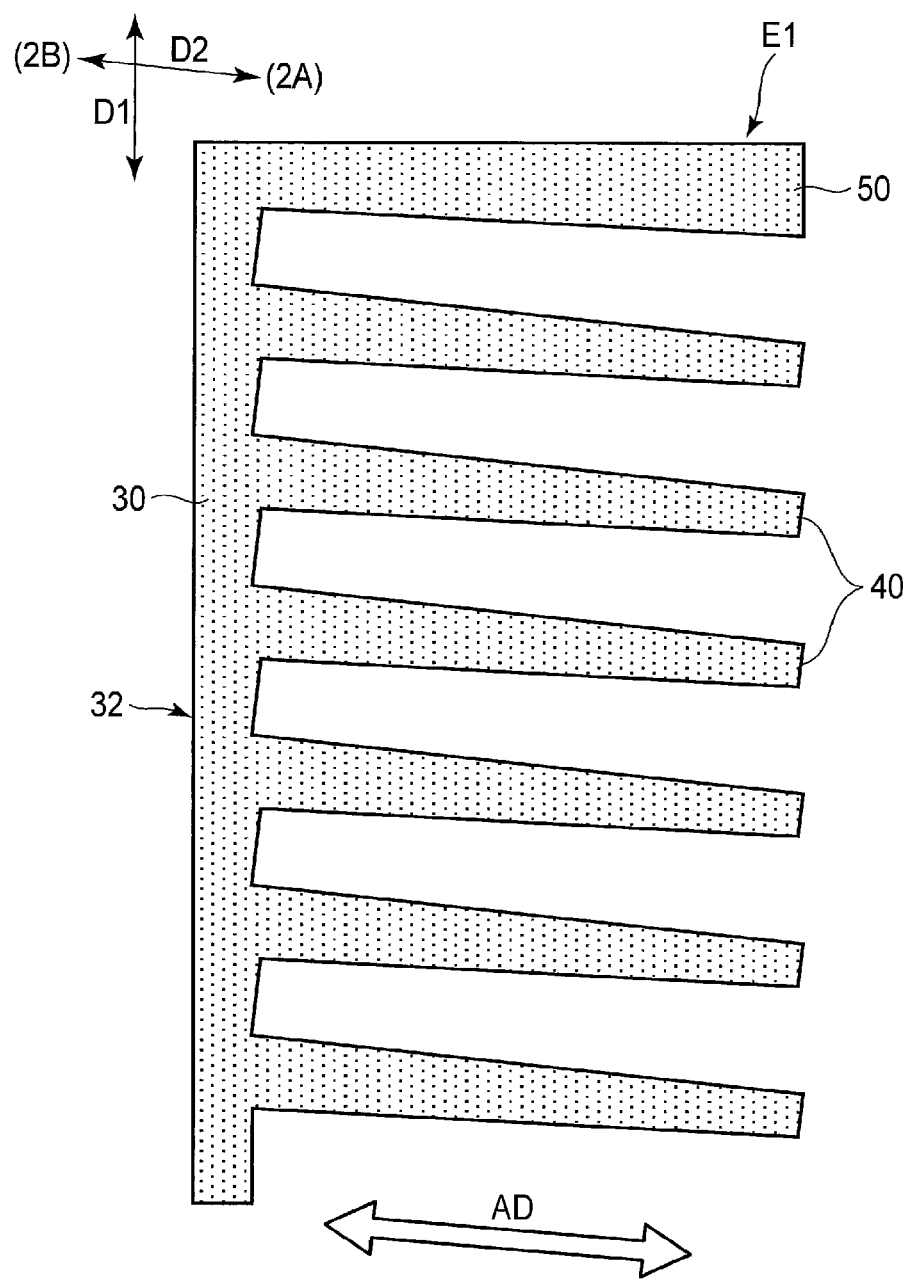
FIG. 13 shows the planar shape of a first electrode according to a third embodiment.

The present embodiment is different from the above embodiments in terms of the shape of each first electrode E1. FIG. 13 shows the planar shape of each first electrode E1 according to the third embodiment. In the first electrode E1 shown in FIG. 13, first directions D1 in which a connective area 30 extends are not perpendicular to second directions D2 in which branch areas 40 extend. The alignment treatment directions AD of a first alignment film 13 and a second alignment film 24 are parallel to the second directions D2. Thus, the alignment treatment directions AD are not perpendicular to the first directions D1. Scanning signal lines G extend in directions perpendicular to the first directions D1 in a manner similar to that of the above embodiments.

The first electrode E1 shown in FIG. 13 is provided in, for example, a first subpixel SP1. In this case, in the first electrode E1 provided in a second subpixel SP2, the branch areas 40 extend in second direction 2B.

In general, the polarization axis of one of a first polarizer PL1 and a second polarizer PL2 conforms to the alignment treatment directions AD. The polarization axis of the other one is perpendicular to the alignment treatment directions AD. For example, when a display area DA is viewed through polarized sunglasses having a polarization axis parallel to the second directions D2 in the structure of the first embodiment, the polarization axis of the second polarizer PL2 may be perpendicular to that of the polarized sunglasses. In this case, the light from the display area DA is mostly blocked. Thus, the contrast of an image may be degraded, and thus, the display image may be difficult to be viewed. When the alignment treatment directions AD are not perpendicular to the first directions D1 as shown in FIG. 13, the polarization axis of the second polarizer PL2 is hardly perpendicular to that of the polarized sunglasses. In this way, it is possible to prevent reduction in contrast.

It was found that the light leak near a side 32 of the connective area 30 was increased when the first directions D1 were not perpendicular to the second directions D2 as shown in FIG. 13. Thus, the method disclosed in FIG. 9 and FIG. 12 may be preferably applied to the first electrode E1 of the present embodiment such that the effect of the light leak is reduced.

In addition to the above explanation, effects similar to those of the above embodiments are obtained from the present embodiment.

Fourth Embodiment

A fourth embodiment is explained. This section mainly looks at the difference from the above embodiments, and the explanations of the same structures as the above embodiments are arbitrarily omitted.

Figure 14:
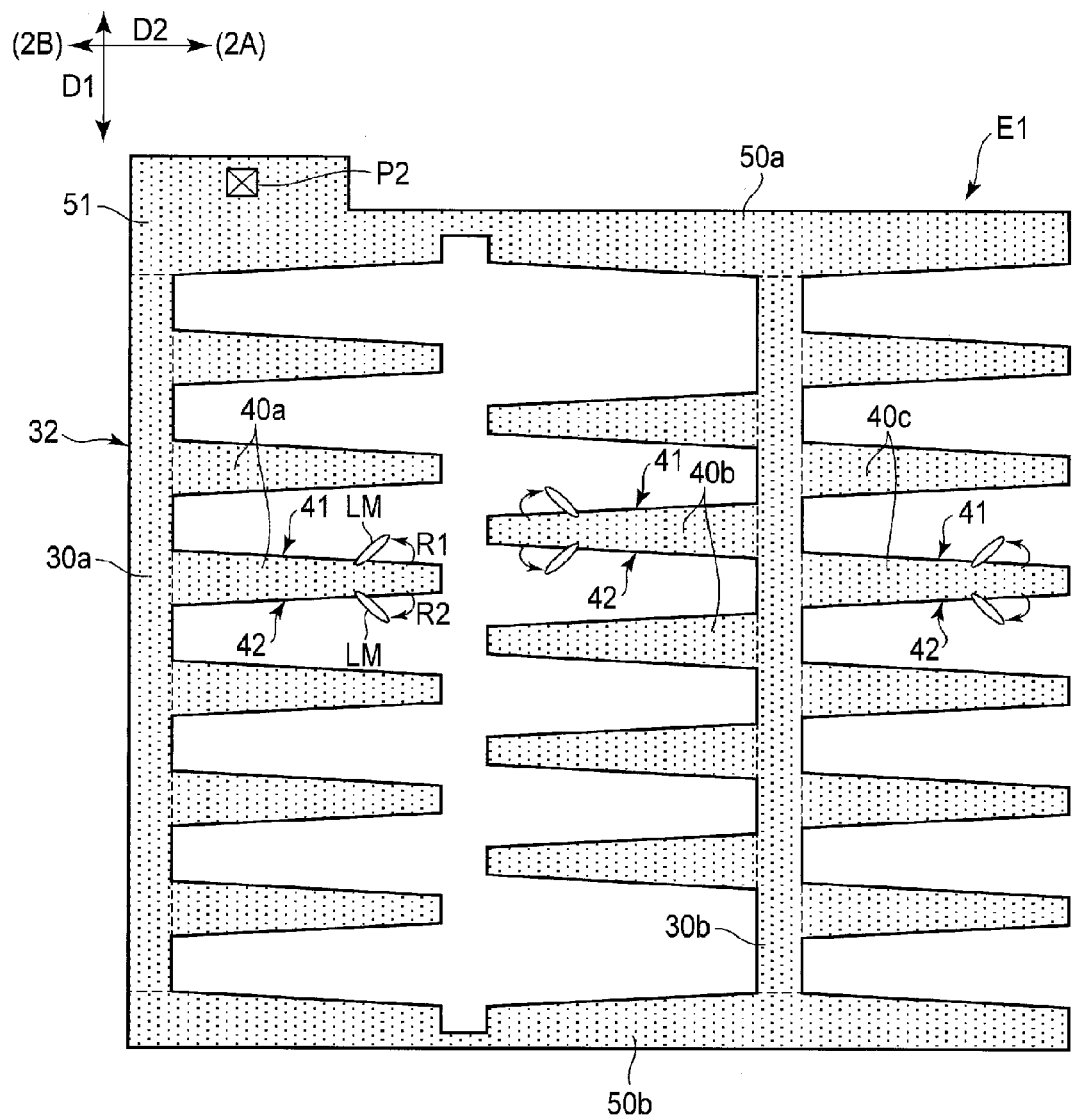
FIG. 14 shows the planar shape of a first electrode according to a fourth embodiment.

The present embodiment is different from the above embodiments in terms of the shape of each first electrode E1. FIG. 14 shows the planar shape of the first electrode E1 of a subpixel SP according to the fourth embodiment. The first electrode E1 shown in FIG. 14 comprises a first connective area 30a, a second connective area 30b, a plurality of first branch areas 40a, a plurality of second branch areas 40b, a plurality of third branch areas 40c, a first end area 50a and a second end area 50b.

Both the first connective area 30a and the second connective area 30b extend in first directions D1. The first and second end areas 50a and 50b connect the end portions of the first and second connective areas 30a and 30b. The first end area 50a comprises an enlarged part 51 in which the width is enlarged in the first directions D1. The above connective position P2 connecting a semiconductor layer SC and the first electrode E1 is included in the enlarged part 51. The first branch areas 40a extend from the first connective area 30a in a second direction 2A between the first connective area 30a and the second connective area 30b. The second branch areas 40b extend from the second connective area 30b in a second direction 2B between the first connective area 30a and the second connective area 30b. The third branch areas 40c extend from the second connective area 30b in second direction 2A. The first branch areas 40a, the second branch areas 40b and the third branch areas 40c are arranged with a constant pitch in the first directions D1.

In the example of FIG. 14, the first branch areas 40a alternate with the second branch areas 40b in the first directions D1. In other words, the first branch areas 40a are out of alignment with the second branch areas 40b in the second directions D1. In a similar manner, the second branch areas 40b alternate with the third branch areas 40c in the first directions D1.

In this type of first electrode E1, each of the branch areas 40 (40a to 40c) can be short in the second directions D2 in comparison with the first electrode E1 shown in the above embodiments. Thus, the function for controlling the alignment in corner portions C1 to C4 ranges to the middle portion of each branch area 40 in a good manner. The alignment of liquid crystal molecules LM can be further stabilized.

In the example of FIG. 14, a first side 41 of the first branch area 40a, a second side 42 of the second branch area 40b and the first side 41 of the third branch area 40c are arranged in substantially a linear fashion. The rotational direction of the liquid crystal molecules LM near each of these sides is a first rotational direction R1. In a similar manner, the second side 42 of the first branch area 40a, the first side 41 of the second branch area 40b and the second side 42 of the third branch area 40c are arranged in substantially a linear fashion. The rotational direction of the liquid crystal molecules near each of these sides is a second rotational direction R2. In this manner, the rotational directions of the liquid crystal molecules LM near the first to third branch areas 40a to 40c are aligned. Thus, the speed of response can be further increased.

The first electrode E1 shown in FIG. 14 is provided in, for example, a first subpixel SP1. In this case, the first electrode E1 provided in a second subpixel SP2 has a shape obtained by reversing the first electrode E1 shown in FIG. 14 based on, for example, the first directions D1 as the axis. In the first electrode E1 provided in the second subpixel SP2, the first branch areas 40a extend from the first connective area 30a in second direction 2B, and further, the second branch areas 40b extend from the second connective area 30b in second direction 2A. The third branch areas 40c extend from the second connective area 30b in second direction 2B.

Similarly, the above light leak may occur near a side 32 of the first connective area 30a in the first electrode E1 of the present embodiment. However, the effect of the light leak can be reduced by using the method disclosed in FIG. 9 and FIG. 12.

In addition to the above explanation, effects similar to those of the above embodiments are obtained from the present embodiment.

Fifth Embodiment

A fifth embodiment is explained. This section mainly looks at the difference from the above embodiments, and the explanations of the same structures as the above embodiments are arbitrarily omitted.

In the present embodiment, each first electrode E1 is a common electrode, and each second electrode E2 is a pixel electrode. In this respect, the present embodiment is different from the above embodiments. FIG. 15 shows a part of a cross-sectional surface of a liquid crystal display device 1 according to the fifth embodiment. In a manner similar to that of FIG. 13, FIG. 15 shows the cross-sectional surface of subpixels SPR, SPG and SPB in second directions D2. The illustration of scanning signal lines G and video signal lines S is omitted. Further, each switching element SW is simplified.

In FIG. 15, the first electrode E1 is provided over subpixels SPR, SPG and SPB. Each of subpixels SPR, SPG and SPB comprises a corresponding second electrode E2. Each second electrode E2 is electrically connected to a corresponding switching element SW.

FIG. 16 is a general planar view of the first electrode E1. FIG. 16 shows an area mainly corresponding to one subpixel SP. In the example of FIG. 16, a subpixel area A comprises a first area A1 and a second area A2 in a manner similar to that of FIG. 4. The first area A1 comprises a connective area 30 and a plurality of branch areas 40. In the present embodiment, the first electrode E1 is formed in the second area A2, and is not formed in the first area A1. In other words, the first area A1 is a slit (aperture) comprising the connective area 30 and the branch areas 40. The external form of the second electrode E2 is, for example, the dashed frame. In a planar view, the second electrode E2 overlaps the first area A1.

The shapes, etc., of the connective area 30 and the branch areas 40 are substantially the same as those of the example shown in FIG. 4. However, in FIG. 16, the width of each branch area 40 in first directions D1 is greater than that of the example of FIG. 4. In the example of FIG. 4, the width of each branch area 40 is less than the interval of the adjacent branch areas 40 near the end of the branch area 40. In FIG. 16, the width of each branch area 40 is greater than the interval of the adjacent branch areas 40 near the end of the branch area 40.

When an electric field is formed between the first electrode E1 and the second electrode E2, the liquid crystal molecules LM near a first side 41 and a second side 42 of each branch area 40 rotate in the same manner as the example of FIG. 6. Near the first side 41, the liquid crystal molecules LM rotate in a first rotational direction R1 from a bottom side 31 to a top side 43. Near the second side 42, the liquid crystal molecules LM rotate in a second rotational direction R2 from the bottom side 31 to the top side 43. Thus, in the structure of the present embodiment, a high-response mode similar to that of the above embodiments can be realized.

In the structure of the present embodiment, similarly, the above light leak may occur near a side 32 of the connective area 30. The effect of the light leak can be reduced by the method explained with reference to FIG. 9 and FIG. 12.

An application example of the same method as FIG. 9 is shown in FIG. 17. The horizontal line in which first subpixels SP1 are arranged in the second directions D2 alternates with the horizontal line in which second subpixels SP2 are arranged in the second directions D2 in the first directions D1. Each of the first subpixels SP1 shown in FIG. 17 is the subpixel SP comprising the first area A1 shown in FIG. 16. Each of the second subpixels SP2 is the subpixel SP comprising a first area A1 having a shape obtained by reversing the first area A1 shown in FIG. 16 based on the first directions D1 as the axis.

The structure explained with reference to FIG. 10 and FIG. 11 can be applied to the connective areas 30, the branch areas 40 and a light-shielding layer 22. The shapes of the first electrodes E1 shown in FIG. 13 and FIG. 14 may be applied to the first areas A1.

Effects similar to those of the above embodiments are obtained from the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in FIG. 9 and FIG. 17, the first subpixels SP1 alternate with the second subpixels SP2 on the basis of the horizontal line. However, the first subpixels SP1 may alternate with the second subpixels SP2 on the basis of a group of subpixels SP (the column) arranged in the first directions D1 between the adjacent video signal lines S.

Alternatively, the first subpixels SP1 may alternate with the second subpixels SP2 on the basis of n horizontal lines arranged in the first directions D1, where n is greater than or equal to two. The first subpixels SP1 may alternate with the second subpixels SP2 on the basis of m columns, where m is greater than or equal to two.

Alternatively, the subpixels may be changed between the first subpixels SP1 and the second subpixels SP2 on the basis of a block including n×m subpixels SP. In this case, for example, the block in which the first subpixels SP1 are arranged may alternate with the block in which the second subpixels SP2 are arranged in the first and second directions D1 and D2.

In each embodiment, the first directions D1 in which the connective areas 30 extend are parallel to the video signal lines S. However, the first directions D1 may not be parallel to the video signal lines S. For example, the first directions D1 may be parallel to the scanning signal lines G. In this case, the second directions D2 in which the branch areas 40 extend and the alignment treatment directions AD may be parallel to, for example, the video signal lines S. Further, the conditions explained about the second portions 22B of the light-shielding layer 22 with reference to FIG. 11 may be applied to the first portions 22A.

Each embodiment discloses a structure which can be adopted when the dielectric anisotropy of the liquid crystal molecules of the liquid crystal layer LC is positive. However, the liquid crystal layer LC may be structured by liquid crystal molecules in which the dielectric anisotropy is negative. In this case, the alignment treatment directions AD (or the initial alignment direction of liquid crystal molecules) may be perpendicular to the extension direction of the branch areas 40.

What is claimed is:
1. A liquid crystal display device comprising:
   a liquid crystal layer including liquid crystal molecules between a first substrate and a second substrate facing the first substrate, wherein the first substrate comprises;
  a plurality of video signal lines;
  a plurality of scanning signal lines;
  a plurality of pixel electrodes;
  a common electrode which faces the plurality of pixel electrodes via an insulating layer, and generates an electric field for the liquid crystal molecules rotation between the plurality of pixel electrodes and the common electrode; and
  a plurality of subpixel areas defined as areas surrounded by the video signal lines and the scanning signal lines,
each of the subpixel areas includes a first area in which a corresponding pixel electrode is formed,
the first area includes a connective area extending along a first direction and a plurality of branch areas extending along a second direction or a reversed second direction,
the branch areas includes a first side and a second side,
the branch areas are connected to the connection area so that the first side and the second side are alternately arranged along the first direction,
when the electric field is generated, a rotational direction of the liquid crystal molecules near the first side of the branch area and a rotational direction of the liquid crystal molecules near the second side of the branch area are different,
the subpixel areas comprise a first subpixel area and a second subpixel area arranged along the first direction and adjacent to each other via a scanning signal line of the scanning signal lines,
the connective area of the first subpixel area is located at a second direction side of the first subpixel area, and
the connective area of the second subpixel area is located at a reversed second direction side of the second subpixel area.

2. The liquid crystal display device of claim 1, wherein the video signal lines extend along the first direction, and the scanning signal lines extend along the second direction.

3. The liquid crystal display device of claim 1, wherein the scanning signal lines include a first scanning signal line, a second scanning signal line adjacent to the first scanning signal line, and a third scanning signal line adjacent to the second scanning signal line,
the first subpixel area is formed between the first scanning signal line and the second scanning signal line, and
the second subpixel area is formed between the second scanning signal line and the third scanning signal line.

4. The liquid crystal display device of claim 1, further comprising a light-shielding layer formed between two subpixel areas that are arranged along the second direction and adjacent to each other, wherein
at least a part of the connective area in one of the two subpixel areas overlaps the light-shielding layer, and an end portion of each of the branch areas in the other one of the two subpixel areas overlaps the light-shielding layer,
a width in which the connective area overlaps the light-shielding layer in the second direction is a first width, and a width in which the end portion of each of the branch areas overlaps the light-shielding layer in the second direction is a second width, and
the first width is greater than the second width.

5. The liquid crystal display device of claim 4, wherein a border portion of the light-shielding layer overlapping the connective area in the one of the two subpixel areas is closer to the end portion side of each of the branch areas in the other one of the two subpixel areas than the connective area in the one of the two subpixel areas.

6. The liquid crystal display device of claim 4, wherein a first border portion of the light-shielding layer overlapping the connective area in the first subpixel area is out of alignment with a second border portion of the light-shielding layer overlapping the end portion of each of the branch areas in the second subpixel area.

7. The liquid crystal display device of claim 6, wherein a width in which the first border portion is out of alignment with the second border portion in the second directions is a third width, and
the third width is less than the first width, and is greater than the second width.

8. The liquid crystal display device of claim 1, wherein the first direction is not perpendicular to the second direction.

9. The liquid crystal display device of claim 1, further comprising a plurality of pixels each including corresponding ones of the subpixel areas, and
all of the subpixel areas included in one of the pixels having a same layout arrangement with respect to the connective area and branch areas thereof.

10. The liquid crystal display device of claim 1, further comprising a plurality of pixels each including corresponding ones of the subpixel areas, wherein
the scanning signal lines include a first scanning signal line, a second scanning signal line adjacent to the first scanning signal line, and a third scanning signal line adjacent to the second scanning signal line,
the pixels include a first pixel and a second pixel between the first scanning signal line and the second scanning signal line, and a third pixel and a fourth pixel between the second scanning signal line and the third scanning signal line,
the first pixel is adjacent to the third pixel, and the second pixel is adjacent to the fourth pixel, and
all of the subpixel areas included in the first pixel and the fourth pixel have a same first layout arrangement with respect to the connective area and branch areas thereof, and all of the subpixel areas included in the second pixel and the third pixel have a same second layout arrangement with respect to the connective area and branch areas thereof.

11. The liquid crystal display device of claim 1, wherein the branch areas included in each of the subpixel areas are arranged one next to another in the first direction, and
when a pitch of arrangement of the branch areas in the first direction is P [μm], and a width between the branch areas of one subpixel area and the connective area of an adjacent subpixel area in the second direction is W [μm], a relationship of PW>8 [μm$^2$] is established.

12. The liquid crystal display device of claim 1, wherein the first substrate comprises a first alignment film,
the second substrate comprises a second alignment film,
the liquid crystal layer is sealed between the first alignment film and the second alignment film,
the liquid crystal molecules have a positive dielectric anisotropy, and
when the electric field is not generated, the liquid crystal molecules are aligned along the second direction by the first alignment film and the second alignment film.

13. The liquid crystal display device of claim 1, wherein the first substrate comprises a first alignment film,
the second substrate comprises a second alignment film, the liquid crystal layer is sealed between the first alignment film and the second alignment film,
the liquid crystal molecules have a negative dielectric anisotropy, and
when the electric field is not generated, the liquid crystal molecules are aligned along the first direction by the first alignment film and the second alignment film.

14. A liquid crystal display device comprising:
a liquid crystal layer including liquid crystal molecules between a first substrate and a second substrate facing the first substrate, wherein
the first substrate comprises;
   a plurality of video signal lines;
   a plurality of scanning signal lines;
   a plurality of pixel electrodes;
   a common electrode which faces the plurality of pixel electrodes via an insulating layer, and generates an electric field for the liquid crystal molecules rotation between the plurality of pixel electrodes and the common electrode; and
   a plurality of subpixel areas defined as areas surrounded by the video signal lines and the scanning signal lines,
each of the subpixel areas includes a first area in which a respective slit area of the common electrode is defined,
the first area includes a connective area extending along a first direction and a plurality of branch areas extending along a second direction or a reversed second direction,
the branch areas includes a first side and a second side,
the branch areas are connected to the connection area so that the first side and the second side are alternately arranged along the first direction,
when the electric field is generated, a rotational direction of the liquid crystal molecules near the first side of the branch area and a rotational direction of the liquid crystal molecules near the second side of the branch area are different,
the subpixel areas comprise a first subpixel area and a second subpixel area arranged along the first direction and adjacent to each other via a scanning signal line of the scanning signal lines,
the connective area of the first subpixel area is located at a second direction side of the first subpixel area, and
the connective area of the second subpixel area is located at a reversed second direction side of the second subpixel area.

15. The liquid crystal display device of claim 14, wherein
the video signal lines extend along the first direction, and the scanning signal lines extend along the second direction.

16. The liquid crystal display device of claim 14, wherein
the scanning signal lines include a first scanning signal line, a second scanning signal line adjacent to the first scanning signal line, and a third scanning signal line adjacent to the second scanning signal line,
the first subpixel area is formed between the first scanning signal line and the second scanning signal line, and
the second subpixel area is formed between the second scanning signal line and the third scanning signal line.

17. The liquid crystal display device of claim 14, wherein
the first direction is not perpendicular to the second direction.

18. The liquid crystal display device of claim 14, further comprising a plurality of pixels each including corresponding ones of the subpixel areas, and
all of the subpixel areas included in one of the pixels having a same layout arrangement with respect to the connective area and branch areas thereof.

19. The liquid crystal display device of claim 14, further comprising a plurality of pixels each including corresponding ones of the subpixel areas, wherein
the scanning signal lines include a first scanning signal line, a second scanning signal line adjacent to the first scanning signal line, and a third scanning signal line adjacent to the second scanning signal line,
the pixels include a first pixel and a second pixel between the first scanning signal line and the second scanning signal line, and a third pixel and a fourth pixel between the second scanning signal line and the third scanning signal line,
the first pixel is adjacent to the third pixel, and the second pixel is adjacent to the fourth pixel, and
all of the subpixel areas included in the first pixel and the fourth pixel have a same first layout arrangement with respect to the connective area and branch areas thereof, and all of the subpixel areas included in the second pixel and the third pixel have a same layout second arrangement with respect to the connective area and branch areas thereof.

20. The liquid crystal display device of claim 14, wherein
the branch areas included in each of the subpixel areas are arranged one next to another in the first direction, and
when a pitch of arrangement of the branch areas in the first direction is P [μm], and a width between the branch areas of one subpixel area and the connective area of an adjacent subpixel area in the second direction is W [μm], a relationship of PW>8 [μm$^2$] is established.

* * * * *